(12) United States Patent
Morimoto et al.

(10) Patent No.: US 10,142,574 B2
(45) Date of Patent: Nov. 27, 2018

(54) IMAGING DEVICE, IMAGING SYSTEM, AND MOVING OBJECT

(71) Applicant: CANON KABUSHIKI KAISHA, Tokyo (JP)

(72) Inventors: Kazuhiro Morimoto, Tokyo (JP); Masahiro Kobayashi, Tokyo (JP); Kazunari Kawabata, Mitaka (JP); Taro Kato, Tokyo (JP); Hiroshi Sekine, Kawagoe (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/660,505

(22) Filed: Jul. 26, 2017

(65) Prior Publication Data
US 2018/0035068 A1  Feb. 1, 2018

(30) Foreign Application Priority Data

Jul. 29, 2016  (JP) ................ 2016-150328

(51) Int. Cl.
*H04N 5/225* (2006.01)
*H04N 5/235* (2006.01)
*G03B 7/00* (2014.01)
*H04N 3/14* (2006.01)
*H04N 5/335* (2011.01)
(Continued)

(52) U.S. Cl.
CPC ....... *H04N 5/37457* (2013.01); *H04N 5/2251* (2013.01); *H04N 5/2329* (2013.01); *H04N 5/23258* (2013.01); *H04N 5/23277* (2013.01); *H04N 5/355* (2013.01); *H04N 5/37452* (2013.01); *H04N 1/60* (2013.01); *H04N 5/23229* (2013.01)

(58) Field of Classification Search
CPC .. H04N 5/2353; H04N 5/353; H04N 5/35581; H04N 5/35554; H04N 5/35536; G03B 7/00; G03B 9/00; G03B 9/08; G03B 9/58; G03B 39/00; G03B 43/02; H01L 27/14609; H01L 27/14641; H01L 27/14643
See application file for complete search history.

(56) References Cited

U.S. PATENT DOCUMENTS 8,520,104 B2 * 8/2013 Fossum ............. H01L 27/14609
 257/222
9,077,911 B2 * 7/2015 Jannard ................. H04N 5/235
2001/0026257 A1 * 10/2001 Kimura ................ G09G 3/2022
 345/87
(Continued)

FOREIGN PATENT DOCUMENTS

JP  2008-028678 A  2/2008
JP  2013-055610    3/2013
(Continued)

*Primary Examiner* — Chia Wei A Chen
(74) *Attorney, Agent, or Firm* — Canon U.S.A., Inc. IP Division

(57) ABSTRACT

An image device. While holding electric charges generated at a photoelectric conversion portion in a first period, a first charge holding portion holds electric charges generated at the photoelectric conversion portion in a second period which is a period that does not succeed the first period and which is different in length from the first period, and a second charge holding portion holds electric charges generated at the photoelectric conversion portion in a third period which is a period that does not overlap the first period and the second period.

22 Claims, 20 Drawing Sheets

(51) Int. Cl.
*H04N 5/3745* (2011.01)
*H04N 5/232* (2006.01)
*H04N 5/355* (2011.01)
*H04N 1/60* (2006.01)

(56) References Cited

U.S. PATENT DOCUMENTS

| | | | | |
|---|---|---|---|---|
| 2010/0194922 A1* | 8/2010 | Honda | ............... | H04N 5/23245 348/231.99 |
| 2010/0253708 A1* | 10/2010 | Kasai | ................... | G09G 3/3258 345/690 |
| 2011/0074999 A1* | 3/2011 | Border | ................ | H04N 5/3458 348/311 |
| 2011/0075009 A1* | 3/2011 | Border | ................... | H04N 5/347 348/317 |
| 2011/0075010 A1* | 3/2011 | Border | ................... | H04N 5/347 348/317 |
| 2011/0090106 A1* | 4/2011 | Huang | ................. | H03M 1/682 341/145 |
| 2012/0268727 A1* | 10/2012 | Schrey | .................... | G01S 7/487 356/5.01 |
| 2012/0300105 A1* | 11/2012 | Deever | ................ | H04N 5/3456 348/302 |
| 2015/0156387 A1 | 6/2015 | Miyakoshi | | |
| 2016/0119566 A1* | 4/2016 | Kususaki | ........... | H04N 5/37452 348/300 |
| 2018/0054582 A1* | 2/2018 | Raynor | ................... | H04N 5/363 |

FOREIGN PATENT DOCUMENTS

| | | |
|---|---|---|
| JP | 2015-109503 A | 6/2015 |
| WO | 2010/018677 A1 | 2/2010 |

* cited by examiner

FIRST DIRECTION →
SECOND DIRECTION ↓

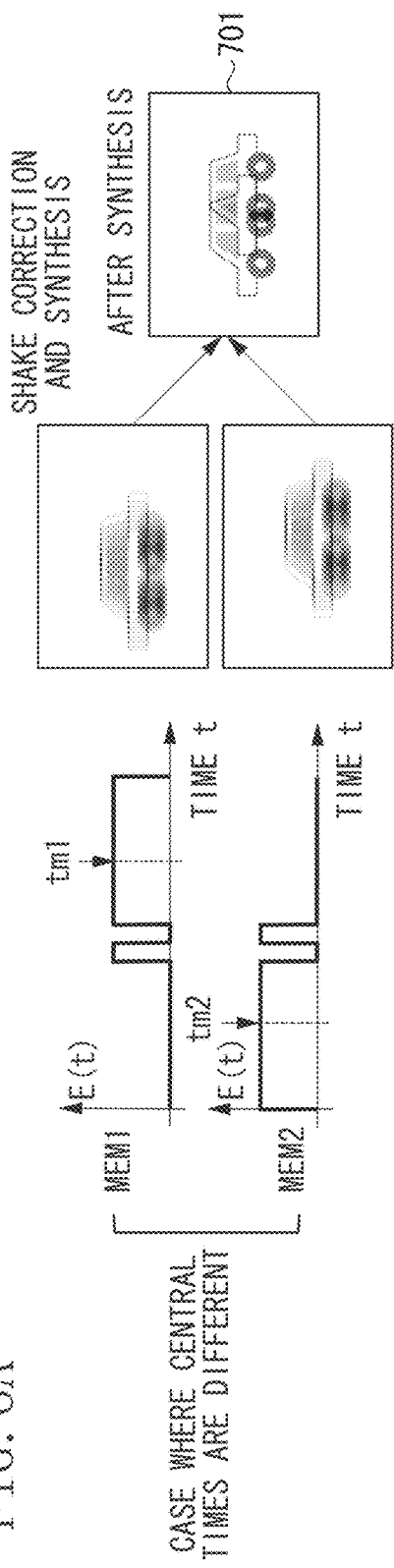
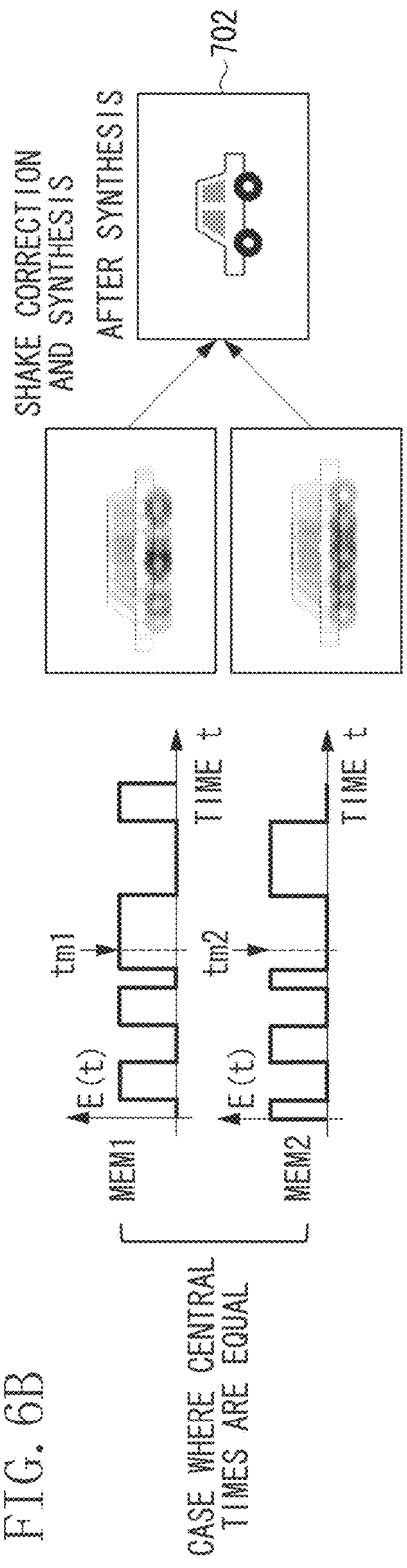
FIG. 6A CASE WHERE CENTRAL TIMES ARE DIFFERENT
FIG. 6B CASE WHERE CENTRAL TIMES ARE EQUAL

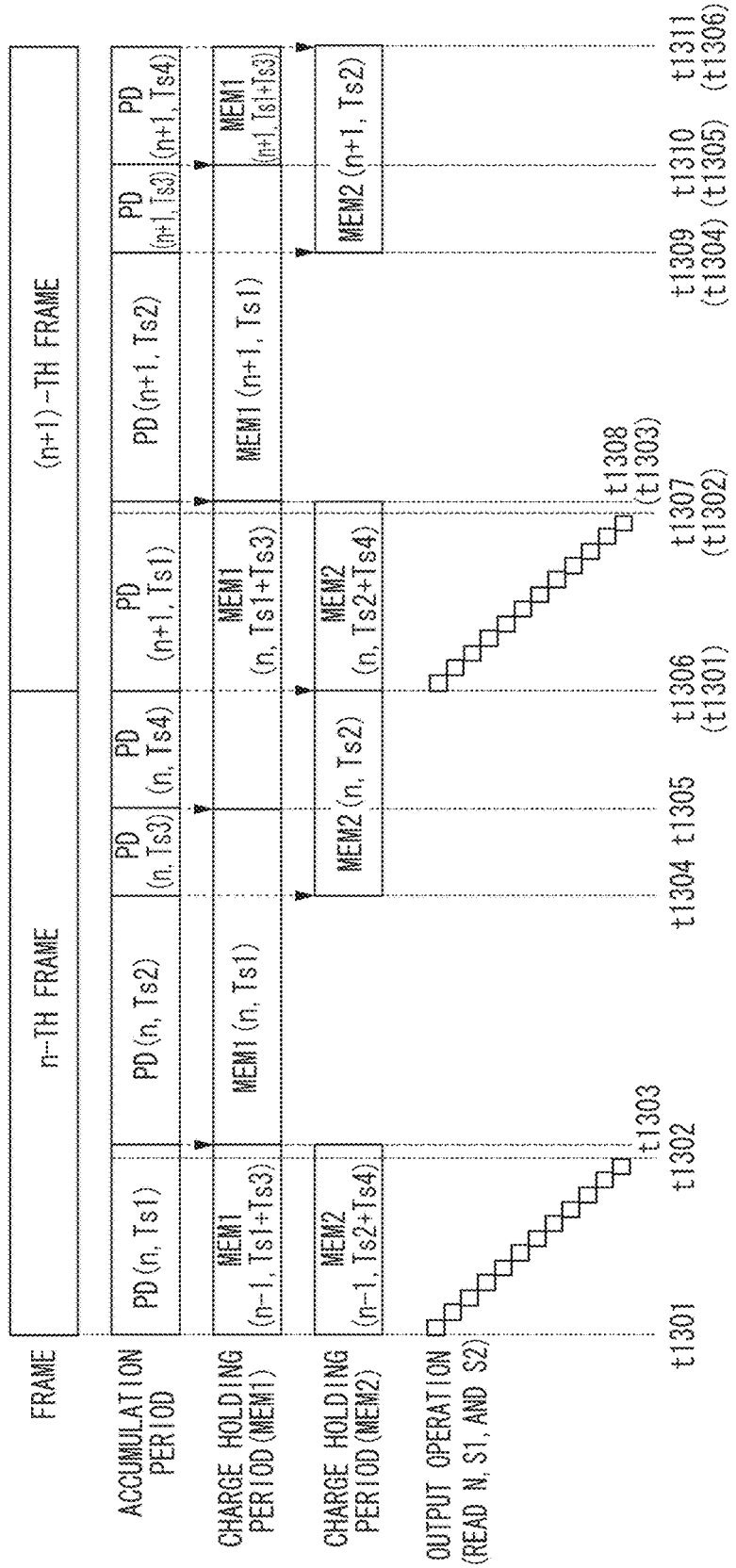

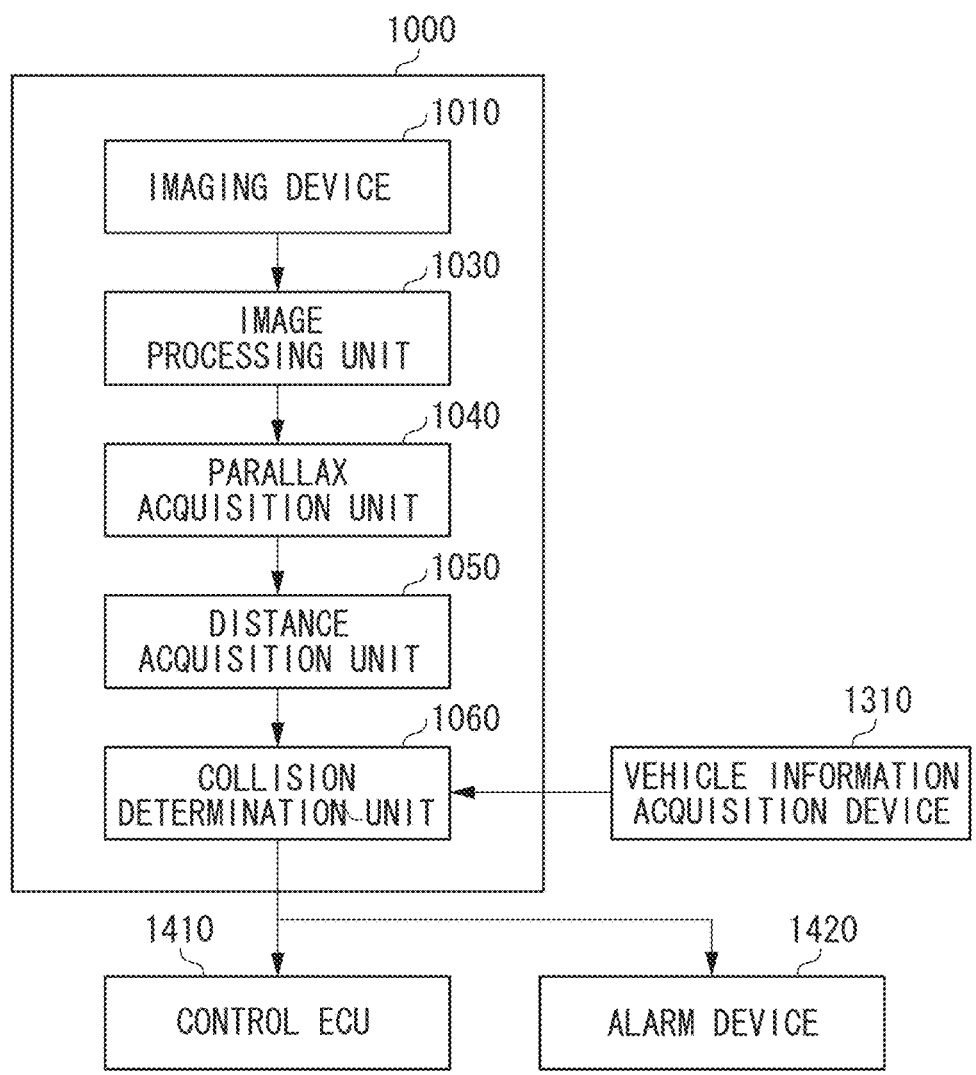

IMAGING DEVICE, IMAGING SYSTEM, AND MOVING OBJECT

BACKGROUND

Technical Field

Aspects of the present disclosure generally relate to an imaging device which has a plurality of charge holding portions, an imaging system, and a moving object.

Description of the Related Art

Japanese Patent Application Laid-Open No. 2015-109503 discusses a configuration for dividing an exposure period into a plurality of periods at intervals of a predetermined time, transferring electric charges generated at a photoelectric conversion portion for each of the plurality of periods to one accumulation portion, and adding together the electric charges at the accumulation portion, in order to acquire one optimal image without regard for an incident light quantity.

To generate a first exposure period and a second exposure period which has a period different in length from the first exposure period, the configuration discussed in Japanese Patent Application Laid-Open No. 2015-109503 discharges electric charges generated at the photoelectric conversion portion in a space between the exposure periods and adds together electric charges generated in the first exposure period and the second exposure period at a charge holding portion. In such a configuration, since electric charges generated at the photoelectric conversion portion in a space between the exposure periods are discharged, the discharged electric charges are unable to be used as signal electric charges, thus becoming wasteful.

SUMMARY

Aspects of the present disclosure are generally directed to providing an imaging device capable of acquiring a signal resulting from addition while preventing or reducing a waste of signal electric charges.

According to an aspect of the present invention, an imaging device includes a plurality of pixels arranged in a plurality of rows and a plurality of columns, each pixel including a photoelectric conversion portion, a first charge holding portion, and a second charge holding portion, wherein, during a first period, electric charges generated at the photoelectric conversion portion are held, the first charge holding portion holds electric charges generated at the photoelectric conversion portion in a second period that does not succeed the first period and having a duration different from the first period, wherein the second charge holding portion holds electric charges generated at the photoelectric conversion portion in a third period that does not overlap with the first period and the second period, and wherein a first charge holding period during which the electric charges generated at the photoelectric conversion portion in the first period and the electric charges generated at the photoelectric conversion portion in the second period are held by the first charge holding portion and a second charge holding period during which the electric charges generated at the photoelectric conversion portion in the third period are held by the second charge holding portion overlap each other.

Further features of the present invention will become apparent from the following description of exemplary embodiments with reference to the attached drawings.

BRIEF DESCRIPTION OF THE DRAWINGS

FIGS. 6A and 6B are explanatory diagrams of the image quality of images subjected to shake correction (image stabilization).
FIG. 18 is a drive concept diagram.
FIGS. 19A and 19B are explanatory diagrams of a moving object.

DESCRIPTION OF THE EMBODIMENTS

Figure 1:
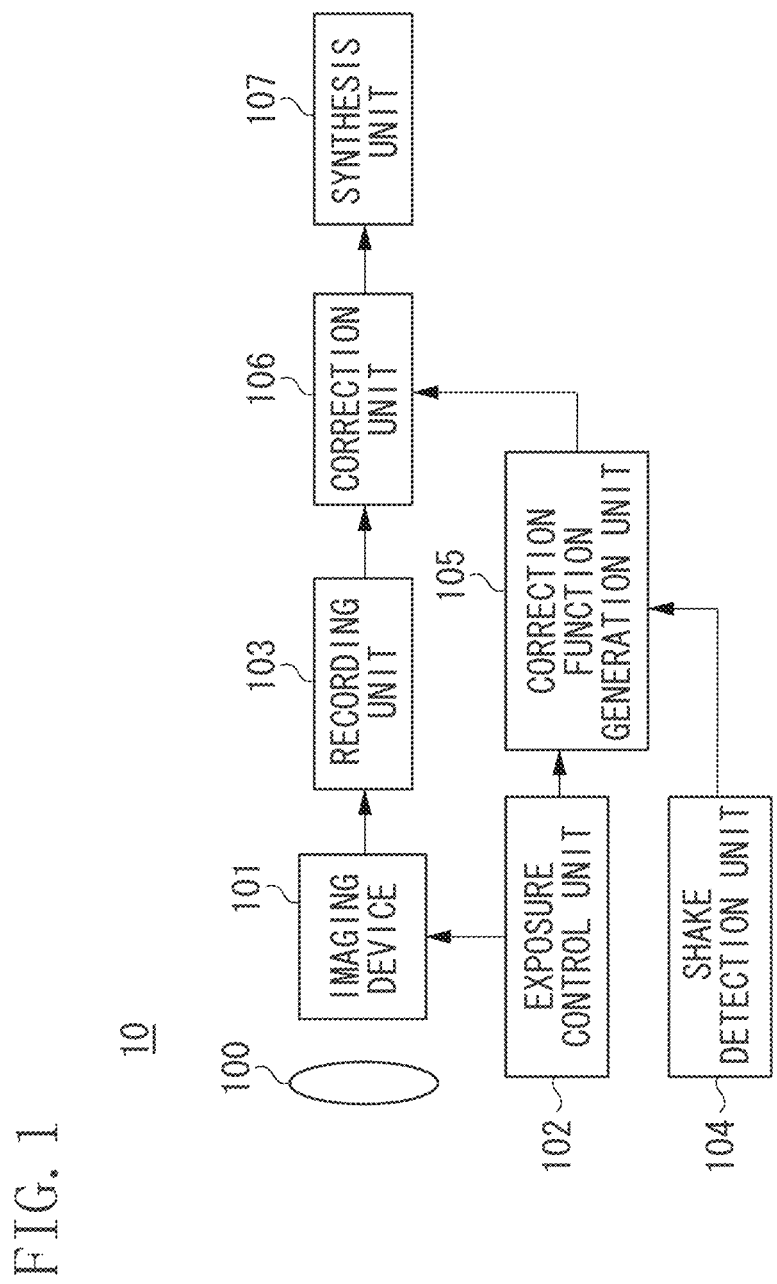
FIG. 1 is a block diagram of an imaging system.

A first exemplary embodiment of the present invention is described with reference to FIG. 1 to FIGS. 6A and 6B. An imaging system and an imaging device according to the present exemplary embodiment are described with reference to FIG. 1 and FIG. 2, respectively. FIG. 1 is a block diagram of an imaging system 10.

The imaging system 10 includes an imaging device 101, an imaging lens group 100, an exposure control unit 102, a recording unit 103, a shake detection unit 104, a correction function generation unit 105, a correction unit 106, and a synthesis unit 107.

Light containing information about a subject passes through the imaging lens group 100 and then forms an image on the imaging device 101, such as a complementary metal-oxide semiconductor (CMOS) image sensor.

The exposure control unit 102 controls the operation of a shutter of the imaging device 101. At least two image signals including signals which are based on electric charges generated in non-identical exposure periods are output from the imaging device 101 and are then recorded on the recording unit 103.

On the other hand, the shake detection unit 104, which is configured with, for example, a gyrosensor, detects a trajectory of shaking of the imaging device 101 or the subject during image capturing. The correction function generation unit 105 generates a correction function for shaking with the use of information about the trajectory of shaking and information about the amount of temporal change obtained from the non-identical exposure periods.

The correction unit 106 corrects an image recorded on the recording unit 103 with the use of the correction function, thus obtaining a corrected image. The synthesis unit 107 is a signal processing unit which combines the corrected image with an uncorrected image recorded on the recording unit 103, or combines a plurality of corrected images with each other, to generate one image (an image for one frame).

The shake detection unit 104 can detect a trajectory of shaking during image capturing by performing image processing based on a plurality of signals output from the imaging device 101 or a summed signal or a difference signal therebetween, and the correction function generation unit 105 can use such a trajectory to generate a correction function.

While, in the present exemplary embodiment, the correction function generation unit 105, the correction unit 106, and the synthesis unit 107 are included in the imaging system 10, at least some of them can be located outside the imaging system 10. In that case, at least part of recorded image processing operations, which include detection of a trajectory of shaking by the above-mentioned image processing, are performed at a later point by a unit located outside the imaging system 10, such as a computer. Furthermore, while, in the present exemplary embodiment, there is provided the shake detection unit 104, a configuration which does not include the shake detection unit 104 can be employed.

Figure 2:
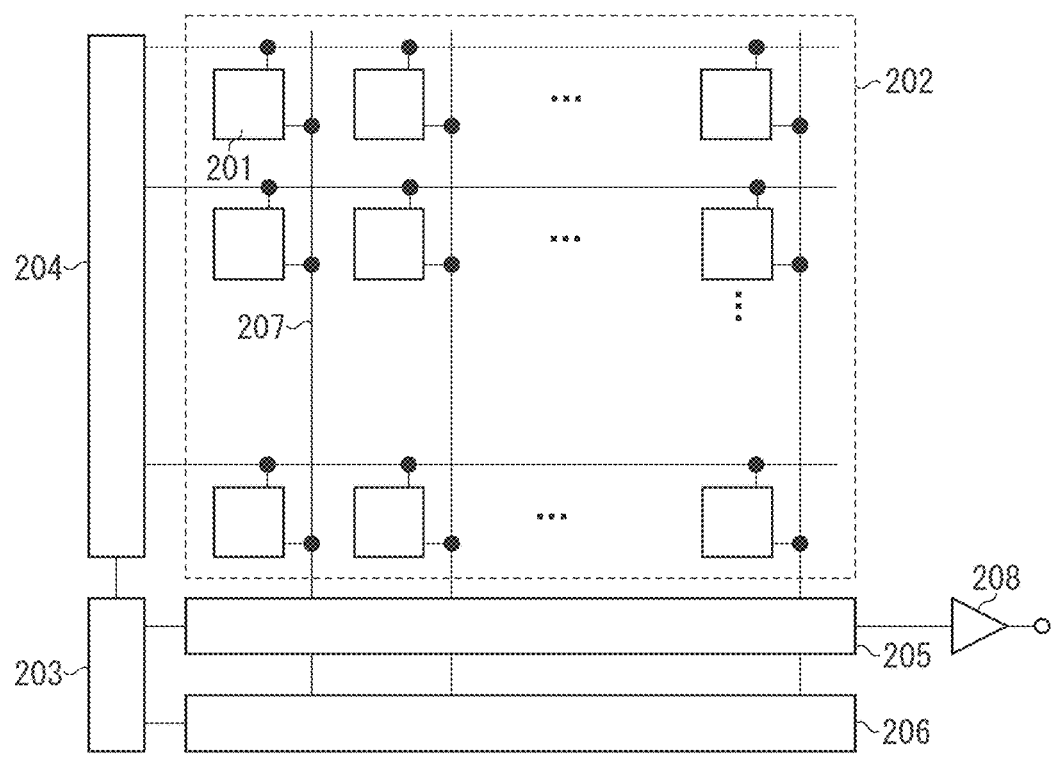
FIG. 2 is a block diagram of an imaging device.

FIG. 2 is a block diagram of the imaging device 101. The imaging device 101 includes a pixel portion 202, a pulse generation portion 203, a vertical scanning circuit 204, a column circuit 205, a horizontal scanning circuit 206, signal lines 207, and an output circuit 208.

The pixel portion 202 includes a plurality of pixels 201 arranged in rows and columns. Here, a plurality of pixels arranged along a first direction is referred to as a pixel row, and a plurality of pixels arranged along a second direction different from the first direction is referred to as a pixel column.

The vertical scanning circuit 204 receives a control pulse signal supplied from the pulse generation portion 203 and then supplies a drive pulse signal to each pixel 201. A logic circuit, such as a shift register or an address decoder, is used as the vertical scanning circuit 204.

The signal lines 207 are arranged for the respective pixel columns of the pixel portion 202 and are used to output signals from the respective pixels 201. The column circuit 205 includes an analog-digital conversion portion and can further include, for example, an amplification circuit. The column circuit 205 receives signals output in parallel via the signal lines 207 and performs analog-to-digital conversion and predetermined processing on the received signals. The predetermined processing includes, for example, noise removal and amplification of a signal.

The horizontal scanning circuit portion 206 supplies, to the column circuit 205, drive pulse signals for sequentially outputting the signals processed by the column circuit 205. The output circuit 208 is configured with, for example, a buffer amplifier and a differential amplifier, and outputs the pixel signals output from the column circuit 205 to a recording unit or a signal processing unit located outside the imaging device 101.

Hereinafter, exemplary embodiments concerning the imaging device 101 and a driving method therefor are described in detail. Furthermore, each of the following exemplary embodiments is merely one mode of the present invention, and should not be construed to limit the present invention.

Figure 3:
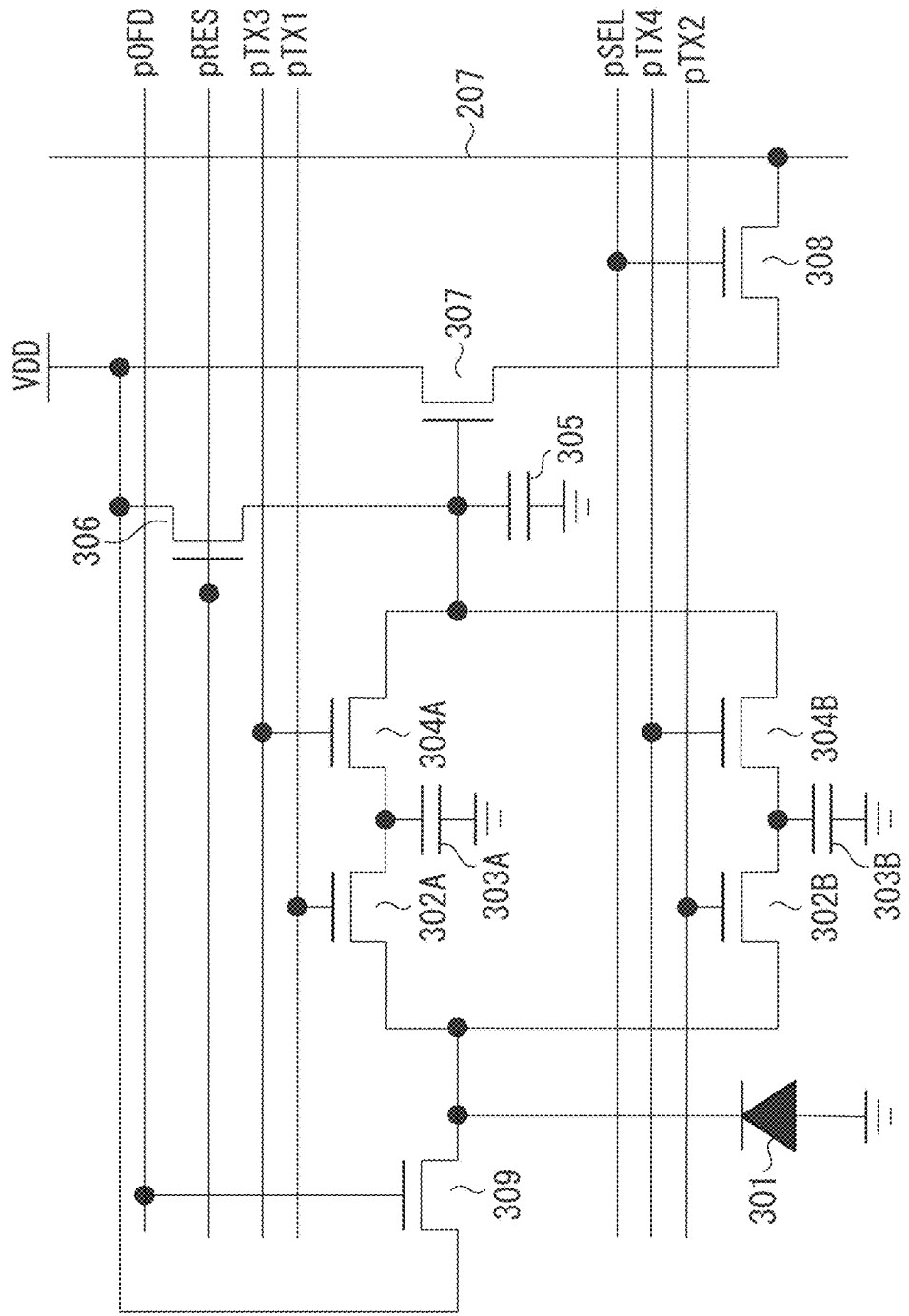
FIG. 3 is an equivalent circuit diagram of a pixel.

FIG. 3 illustrates an example of an equivalent circuit of the pixel 201. In each exemplary embodiment, unless otherwise stated, a description is made about a drive pulse signal used to form one image, but a moving image can be formed by performing each drive pattern a plurality of times.

The polarity of an electric charge used as a signal electric charge in an electric charge pair generated in a photoelectric conversion portion is referred to as a "first conductivity type". Here, an electric charge of the first conductivity type is an electron, and an electric charge of the second conductivity type, which is opposite to the first conductivity type, is a hole.

The equivalent circuit is not limited to that illustrated FIG. 3, but some configuration can be shared by a plurality of pixels. Furthermore, while FIG. 3 illustrates the pixel 201 including a charge discharging portion, the present exemplary embodiment is not limited to such a configuration. Suffixes A and B are used to discriminate each charge holding portion and each transfer portion in each pixel, but, in the case of describing a function used in common, the function is described with no suffix attached. In the case of describing functions required for distinction, the functions are described with the respective suffixes attached. These also apply to the exemplary embodiment described below.

A photoelectric conversion portion 301 generates an electric charge pair according to incident light and then accumulates an electron as a signal electric charge. For example, a photodiode is used as the photoelectric conversion portion 301.

A charge holding portion 303A (a first charge holding portion) and a charge holding portion 303B (a second charge holding portion) hold electrons transferred from the photoelectric conversion portion 301 via a transfer portion 302A (a first transfer portion) and a transfer portion 302B (a second transfer portion), respectively, which are described below. Here, the charge holding portion 303A is treated as one charge holding portion, and the charge holding portion 303B is treated as the other charge holding portion.

A floating diffusion (FD) 305 is a semiconductor region to which the electric charges held by the charge holding portion 303A and the charge holding portion 303B are transferred via a transfer portion 304A (a third transfer portion) and a transfer portion 304B (a fourth transfer portion). The FD 305 holds the electric charges for a predetermined period.

The transfer portion 302A transfers an electron generated by the photoelectric conversion portion 301 to the charge holding portion 303A. The transfer portion 302B transfers an electron generated by the photoelectric conversion portion 301 to the charge holding portion 303B.

The transfer portion 304A transfers the electron held by the charge holding portion 303A to the FD 305. The transfer portion 304B transfers the electron held by the charge holding portion 303B to the FD 305. The transfer portion 302A, the transfer portion 302B, transfer portion 304A, and the transfer portion 304B are supplied with drive pulses pTX1, pTX2, pTX3, and pTX4, respectively, to be switched between ON and OFF. When being turned on, each transfer portion transfers an electron. For example, a transfer transistor is used as the transfer portions 302 and 304.

A transfer portion 309 (a fifth transfer portion) transfers an electron generated by the photoelectric conversion portion 301 to a charge discharging portion. The charge discharging portion is supplied with, for example, a power supply voltage VDD. Then, the transfer portion 309 is supplied with a drive pulse pOFD and is switched between ON and OFF in response to the drive pulse pOFD. When being turned on, the transfer portion 309 transfers an electron generated by the photoelectric conversion portion 301 to the charge discharging portion.

For example, an amplifying transistor is used as an amplifying portion 307. In that case, the input node of the amplifying portion 307 is connected to the FD 305, the lines connected to the gate of the amplifying transistor, the transfer portions 304A and 304B, and the source of a reset transistor 306.

The amplifying portion 307 amplifies a signal which is based on the electrons transferred by the transfer portion 304A and the transfer portion 304B to the FD 305 and then outputs the amplified signal. More specifically, the electron transferred to the FD 305 is converted into a voltage corresponding to the amount of the electron, and an electrical signal corresponding to the voltage is output to the signal line 207 via the amplifying portion 307. For example, an amplifying transistor is used as the amplifying portion 307, which configures a source follower circuit together with a current source (not illustrated).

The reset transistor 306 resets the electric potential of the input node of the amplifying portion 307 to an electric potential in the vicinity of the power supply voltage VDD. The gate of the reset transistor 306 is supplied with a drive pulse pRES so that the reset transistor 306 is switched between ON and OFF.

A selection transistor 308 switches between connection and non-connection of the pixel 201 to the signal line 207. According to a switching operation of the selection transistor 308 for each pixel 201, signals from the pixels 201 are output to the signal line 207 in steps of one pixel or in steps of a plurality of pixels. The drain of the selection transistor 308 is connected to the output node of the amplifying portion 307, and the source of the selection transistor 308 is connected to the signal line 207. The gate of the selection transistor 308 is supplied with a drive pulse pSEL so that the selection transistor 308 is switched between ON and OFF so as to select a row.

Furthermore, instead of the configuration in the present exemplary embodiment, the selection transistor 308 can be located between the output node of the amplifying portion 307 and the power supply line supplied with the power supply voltage VDD. Moreover, without the selection transistor 308 being provided, the output node of the amplifying portion 307 can be connected to the signal line 207.

Figure 4:
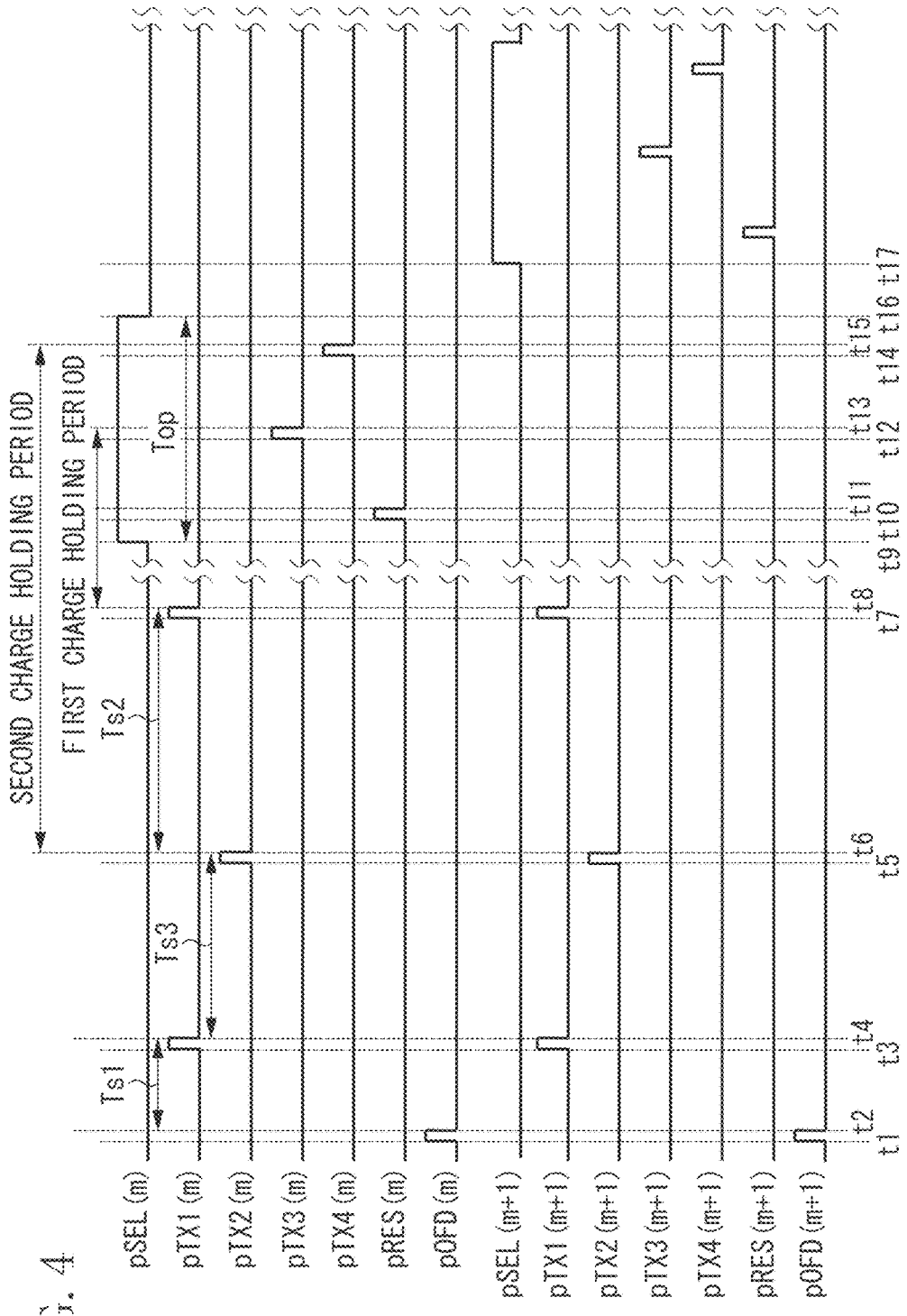
FIG. 4 illustrates drive pulses.

FIG. 4 is a drive pulse diagram used to describe a pixel driving method according to the present exemplary embodiment. Referring to the drive pulse diagram of FIG. 4, a drive pulse to be supplied to the pixels 201 in the m-th row and a drive pulse to be supplied to the pixels 201 in the (m+1)-th row which are output in one frame period are described.

One image can be obtained from a signal corresponding to electric charges accumulated for one frame period. In the case of obtaining a moving image, images for a plurality of frame periods are obtained. In that case, during a time from the start of a charge accumulation period for a pixel row in a certain frame period (the (n+1)-th frame) to the end of the charge accumulation period, an output period for all of the pixel rows in a preceding frame period (the n-th frame) can be started and then ended. Such frame periods are repeated for a predetermined period.

In FIG. 4, drive pulses are described with "(m)" attached to the tail end of the name of a drive pulse for the m-th row out of a plurality of pixel rows and "(m+1)" attached to the tail end of the name of a drive pulse for the (m+1)-th row. In the case of describing drive pulses without distinguishing rows, "(m)" or "(m+1)" is not attached to the tail end of the pulse name.

In the present exemplary embodiment, a drive method for a global electronic shutter operation, in which the start of charge accumulation in a photoelectric conversion portion and the transfer of an electric charge from the photoelectric conversion portion to a charge holding portion are aligned between a plurality of pixel rows, is described. However, another electronic shutter operation using, for example, a rolling shutter can be employed.

Next, a charge accumulation period Ts and an output period Top in FIG. 4 are described. Concerning one pixel 201 or one pixel row, in response to resetting of the photoelectric conversion portion 301 of the pixel 201, the charge accumulation period Ts starts, and, after the elapse of a predetermined period, in response to an electric charge generated at the photoelectric conversion portion 301 being transferred to the charge holding portion 303, the charge accumulation period Ts ends. A period from the time point when a predetermined pixel row is selected or the time point when the FD 305 in a predetermined pixel row is reset to the time point when outputting of signals, which are based on electric charges held by the respective charge holding portions in the predetermined pixel row, to the signal line 207 is completed is referred to as the "output period Top".

Referring to FIG. 4, at time t1, the drive pulse pOFD becomes at high level so that the transfer portion 309 is turned on, and, at time t2, the drive pulse pOFD becomes at low level so that the transfer portion 309 enters an off state. With this, electrons generated at the photoelectric conversion portion 301 are transferred to the charge discharging portion and the photoelectric conversion portion 301 is then reset.

Then, at time t2, a charge accumulation period Ts1 (a first period) starts. At time t3, the drive pulse pTX1 becomes at high level, so that the transfer portion 302A is turned on. At time t4, the drive pulse pTX1 becomes at low level, so that the transfer portion 302A is turned off. Then, the charge accumulation period Ts1 ends.

With this, electric charges generated at the photoelectric conversion portion 301 in the charge accumulation period Ts1 (a period between time t2 and time t4) are transferred to the charge holding portion 303A and are then held by the charge holding portion 303A.

Moreover, at time t4, a charge accumulation period Ts3 (a third period), which is the next charge accumulation period, starts. At time t5, the drive pulse pTX2 becomes at high level, so that the transfer portion 302B is turned on. At time t6, the drive pulse pTX2 becomes at low level, so that the transfer portion 302B is turned off. Then, the charge accumulation period Ts3 ends.

At this time, electric charges generated at the photoelectric conversion portion 301 in the charge accumulation period Ts3 (a period between time t4 and time t6) are transferred to the charge holding portion 303B and are then held by the charge holding portion 303B. Then, a second charge holding period, which is a period in which to hold electric charges at the charge holding portion 303B, starts. Moreover, at time t6, a charge accumulation period Ts2 (a second period), which is the next charge accumulation period, starts.

At time t7, the drive pulse pTX1 becomes at high level so that the transfer portion 302A is turned on, and, at time t8, the drive pulse pTX1 becomes at low level so that the transfer portion 302A is turned off. Then, the charge accumulation period Ts2 ends.

Electric charges generated at the photoelectric conversion portion 301 in the charge accumulation period Ts2 (a period between time t6 and time t8) are transferred to the charge holding portion 303A, and electric charges generated at the photoelectric conversion portion 301 in the charge accumulation period Ts1 and the charge accumulation period Ts2 are then held by the charge holding portion 303A. At this time, a first charge holding period, which is a period in which to hold, at the charge holding portion 303A, the electric charges generated at the photoelectric conversion portion 301 in the charge accumulation period Ts1 and the electric charges generated at the photoelectric conversion portion 301 in the charge accumulation period Ts2, starts.

Furthermore, in FIG. 4, the charge accumulation period Ts3 can be started by making the drive pulse pOFD at high level and at low level during the period between time t4 and time t5. This also applies to the other charge accumulation periods.

In the charge accumulation periods Ts1 and Ts2, the drive pulse pTX1 can be kept at high level or can become at high level a plurality of times. Similarly, in the charge accumulation period Ts3, the drive pulse pTX2 can be kept at high level or can become at high level a plurality of times. According to such driving, a residue of electric charges in the photoelectric conversion portion 301 can be prevented or reduced.

According to the above drive pulses, while the electric charges generated at the photoelectric conversion portion 301 in the charge accumulation period Ts1 (a period between time t2 and time t4) are held by the charge holding portion 303A, the electric charges generated at the photoelectric conversion portion 301 in the charge accumulation period Ts2 (a period between time t6 and time t8) are transferred to the charge holding portion 303A. In other words, while the reset transistor 306 is kept OFF, the transfer portion 302A is turned on and off in the period between time t3 and t4, and then, the transfer portion 302A is turned on and off in the period between time t7 and t8. With this, the charge holding portion 303A holds therein the electric charges generated in the charge accumulation period Ts1 and the electric charges generated in the charge accumulation period Ts2.

Furthermore, in the period between time t1 and t2, the charge holding portion 303A and the charge holding portion 303B can be reset by making the drive pulses pTX1 and pTX2 at high level and then at low level to turn on and then off the transfer portions 302A and 302B. Alternatively, the charge holding portion 303A and the charge holding portion 303B can be reset by making the drive pulses pTX3, pTX4, and pRES at high level and then at low level to turn on and then off the transfer portions 304A and 304B and the reset transistor 306. In these cases, the above drive pulses are made OFF at time t2.

In the present exemplary embodiment, the charge accumulation period Ts1 and the charge accumulation period Ts2 in which electric charges to be held by the charge holding portion 303A are generated at the photoelectric conversion portion 301 are inconsecutive periods. A signal which is based on summed electric charges obtained by adding together electric charges accumulated in a plurality of such inconsecutive charge accumulation periods is referred to as a "coded captured image signal".

Furthermore, the charge accumulation period Ts3, in which electric charges to be held by the charge holding portion 303B are generated, does not overlap each of the charge accumulation period Ts1 and the charge accumulation period Ts2, in which electric charges to be held by the charge holding portion 303A are generated. In other words, in charge accumulation periods, pulses for turning on the transfer portions 302 at different times are used as the drive pulses pTX1 and pTX2. With this, electric charges generated at the photoelectric conversion portion 301 are time-divisionally transferred to and held by the charge holding portion 303A and the charge holding portion 303B.

According to such a configuration, electric charges generated at the photoelectric conversion portion 301 in the period between time t4 and time t6 are held by the charge holding portion 303B without being discharged. Therefore, according to the present exemplary embodiment, the electric charges generated at the photoelectric conversion portion 301 in the period between time t4 and time t6 can be held, so that a waste of a photo signal can be reduced.

Figure 8:
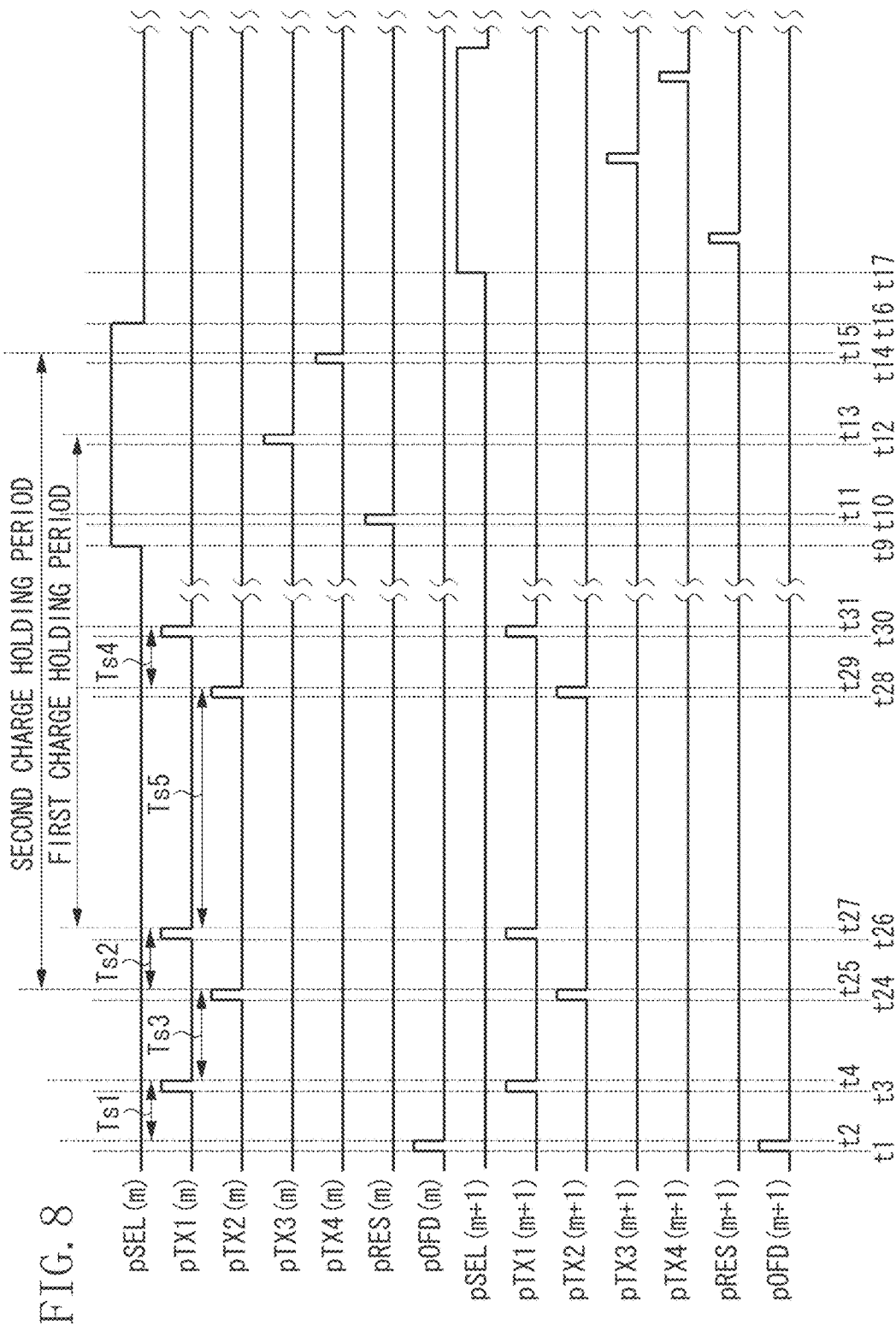
FIG. 8 illustrates drive pulses.

Furthermore, there can be a charge accumulation period which is a period that does not succeed the charge accumulation period Ts3 and which does not temporally overlap each of the charge accumulation periods Ts1 and Ts2 (for example, a charge accumulation period Ts5 illustrated in FIG. 8). In that case, electric charges in the charge accumulation period Ts5 are transferred to the charge holding portion 303B, in which electric charges generated in the charge accumulation period Ts3 are held. With this, summed electric charges obtained by adding together the electric charges generated at the photoelectric conversion portion 301 in the charge accumulation period Ts3 and the electric charges generated at the photoelectric conversion portion 301 in the charge accumulation period Ts5 are held by the charge holding portion 303B.

Moreover, in the present exemplary embodiment, the charge accumulation period Ts1 and the charge accumulation period Ts2 are set different from each other in length of period. The case where the length of period is different includes, for example, a case where the difference in length between two charge accumulation periods Ts1 and Ts2 is longer than a time that is 1/10 of an output period Top for one pixel row.

According to such a configuration being used, the coded captured image signal can be obtained based on summed electric charges including electric charges generated in different charge accumulation periods. In addition, for the same reason, the charge accumulation period Ts3 and a charge accumulation period can be set different from each other in length of period.

Next, an output period Top for the m-th row is described. At time t9, the drive pulse pSEL(m) becomes at high level, so that the selection transistor 308 enters an on state. With this, the m-th pixel row is selected. At this time, the output period Top starts.

At time t10, the drive pulse pRES(m) becomes at high level, so that the reset transistor 306 enters an on state. At time t11, the drive pulse pRES(m) becomes at low level, so that the reset transistor 306 enters an off state. With this, the electric potential of the FD 305 becomes a reset potential (for example, the power supply voltage VDD). In a period between time t11 and time t12, the reset potential of the FD 305 is output as a signal N to the signal line 207.

At time t12, the drive pulse pTX3 becomes at high level so that the transfer portion 304A is turned on, and, at time t13, the drive pulse pTX3 becomes at low level so that the transfer portion 304A enters an off state. At time t13, holding of electric charges at the charge holding portion 303A ends, so that the first charge holding period ends. With this, the electric charges generated at the photoelectric conversion portion 301 in the charge accumulation period Ts1 and the electric charges generated at the photoelectric conversion portion 301 in the charge accumulation period Ts2 are transferred from the charge holding portion 303A to the FD 305. In other words, the electric charges accumulated in the charge accumulation periods Ts1 and Ts2 are held by the FD 305. Then, in a period between time t13 and time t14, a signal S1 is output to the signal line 207.

Next, at time t14, the drive pulse pTX4 becomes at high level so that the transfer portion 304B is turned on, and, at time t15, the drive pulse pTX4 becomes at low level so that the transfer portion 304B is turned off. At time t15, holding of electric charges at the charge holding portion 303B ends, so that the second charge holding period ends.

With this, the electric charges generated at the photoelectric conversion portion 301 in the charge accumulation period Ts3 are transferred from the charge holding portion 303B to the FD 305. At this time, the electric charges accumulated in the charge accumulation periods Ts1, Ts2, and Ts3 are held by the FD 305. Then, in a period between time t15 and time t16, a signal S2 is output to the signal line 207.

At time t16, the drive pulse pSEL(m) becomes at low level, so that the selection transistor 308 enters an off state. With this, the m-th pixel row becomes non-selected, so that the output period Top ends.

At and after time t17, an output period Top similar to that of the m-th pixel row appears in each pixel row. When the output periods Top for all of the pixel rows end, outputting of signals for one frame ends.

Then, with respect to three signals (N, S1, and S2) output to the signal line 207, the imaging device 101 or the imaging system 10 performs calculations of "S1−N" and "S2−S1".

The calculation of "S1−N" enables acquiring a signal S3 that is based on electric charges held by the charge holding portion 303A (electric charges generated at the photoelectric conversion portion 301 in the charge accumulation periods Ts1 and Ts2) from which a fixed pattern noise is removed. The exposure function of the signal S3 obtained here is aperiodic, and the signal S3 becomes a coded captured image signal.

The calculation of "S2−S1" enables acquiring a signal S4 that is based on electric charges held by the charge holding portion 303B (electric charges generated at the photoelectric conversion portion 301 in the charge accumulation period Ts3) from which a fixed pattern noise is removed. In a case where the signal S4 is generated from electric charges in a plurality of charge accumulation periods, the exposure function of the signal S4 is aperiodic, and the signal S4 becomes a coded captured image signal.

Furthermore, a fixed pattern noise is removed here, but does not need to be removed.

In the present exemplary embodiment, the sum of periods in which electric charges to be held by the charge holding portion 303A are generated at the photoelectric conversion portion 301 is referred to as a "first effective charge accumulation period". The sum of periods in which electric charges to be held by the charge holding portion 303B are generated at the photoelectric conversion portion 301 is referred to as a "second effective charge accumulation period". The start time and end time of the first effective charge accumulation period are different from the start time and end time of the second effective charge accumulation period, respectively.

When a comparison is made between the first effective charge accumulation period and the second effective charge accumulation period, it is desirable that electric charges held by the charge holding portion corresponding to a shorter effective charge accumulation period be first transferred to the FD 305.

For example, in a case where the first effective charge accumulation period is shorter than the second effective charge accumulation period, if electric charges held by the charge holding portion 303B are first transferred to the FD 305, the FD 305 may become saturated. In other words, when electric charges held by the charge holding portion 303A are transferred to the FD 305 after the electric charges held by the charge holding portion 303B are transferred to the FD 305, the FD 305 is already saturated, so that a correct signal cannot be acquired.

On the other hand, if a signal that is based on electric charges held by the charge holding portion 303A is first transferred to the FD 305 and is then read out therefrom, when the electric charges held by the charge holding portion 303A has been transferred to the FD 305, the FD 305 may be unsaturated. In such a case, at least the signal S1 enables acquiring a correct signal, and the signal S3, which is based on the electric charges held by the charge holding portion 303A, enables acquiring a correct signal.

This also applies a case where, while the FD 305 is not saturated, when a signal is output to the signal line 207, the dynamic range of the signal line 207 and a later-stage circuit may be exceeded.

According to such a configuration, the signal S1 is likely to fall within the above-mentioned dynamic range as compared with the signal S2, so that crushed blacks (a loss of shadow detail) can be prevented or reduced.

While, in the above-described exemplary embodiment, an example has been described in which electric charges are transferred from two charge holding portions to one FD, electric charges can be transferred from the charge holding portion 303A and the charge holding portion 303B to respective FDs 305.

However, according to a method of causing a plurality of charge holding portions to share the FD 305, as in the present exemplary embodiment, since the signal N only needs to be output once, outputting of signals can be speeded up. Then, a signal S3 that is based on the summed electric charges held by the charge holding portion 303A for each pixel row is output, and the output analog signal is subjected to analog-digital conversion, so that a first signal which is a digital signal can be obtained. Then, the first signal is corrected by the correction unit 106 illustrated in FIG. 1, so that a first image signal with reduced shaking can be obtained.

Similarly, a signal S4 that is based on the summed electric charges held by the charge holding portion 303B is output, and the output analog signal is subjected to analog-digital conversion, so that a second signal which is a digital signal can be obtained. Then, the second signal is corrected by the correction unit 106 illustrated in FIG. 1, so that a second image signal with reduced shaking can be obtained.

The first image signal and the second image signal are subjected to synthesis processing by, for example, by the synthesis unit 107 illustrated in FIG. 1, so that an image signal serving as one image with reduced shaking and with a high use efficiency of photo signals can be obtained.

While, here, the second image signal subjected to shake correction (image stabilization) is used as a signal to be combined with the first image signal by the synthesis unit 107, the second signal, which is not subjected to shake correction, can be used. However, an image obtained by performing synthesis processing on the first image signal and the second image signal is an image with further reduced shaking than an image obtained by performing synthesis processing on the first image signal and the second signal. These also apply to the other exemplary embodiments.

According to the above-described configuration, high-speed exposure can be readily implemented as compared with a case where exposure is controlled by opening and closing of a usually-employed shutter (for example, a mechanical shutter). This is because electric charges in a plurality of charge accumulation periods can be obtained by controlling the timing and the number of times of pulses to be applied to the transfer portion 304A and the transfer portion 304B.

A coding pattern and the image quality of an image subjected to shake correction are described with reference to FIGS. 5A, 5B, and 5C and FIGS. 6A and 6B. The following description also applies to the other exemplary embodiments.

The coding pattern refers to information about a temporal change in a period in which electric charges to be held by the first charge holding portion 303A or the second charge holding portion 303B are generated at the photoelectric conversion portion 301.

In the case of removing shaking of a subject by correcting the signal S3, the image quality of an image subjected to shake correction varies depending on the way of selecting a temporal pattern of a plurality of charge accumulation periods in which electric charges to be held by the charge holding portion 303A are accumulated (the coding pattern).

Figure 5A:
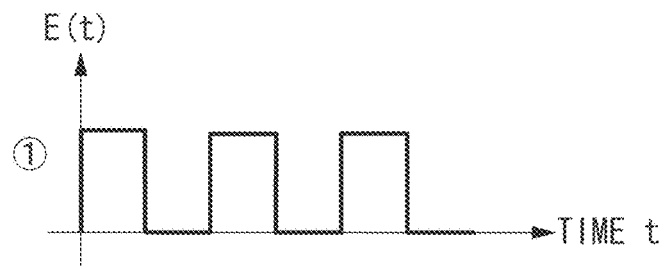
FIGS. 5A, 5B, and 5C are explanatory diagrams of coding patterns.

For example, in a case where a periodic coding pattern such as that illustrated in the graph of FIG. 5A is used, if a shaken image of a subject with a pattern having a specific spatial frequency (for example, a vertically-striped pattern) is captured, information about such a frequency would disappear due to shaking of the subject. Therefore, the pattern (for example, vertical stripes) may become unable to be restored at the time of correction.

Here, the term "periodic" represents a case where, when the coding pattern is expressed by a digital signal sequence such as "1100101 . . . ", if the digital signal sequence is equally divided into small signal sequences, all of the small signal sequences are the same.

For example, in the case of a digital signal sequence having a coding pattern of "101101101", since, if it is equally divided into three small signal sequences, all of the small signal sequences are "101", the digital signal sequence is periodic. Moreover, since all of the periods after a charge accumulation period can be regarded as "0", for example, such a pattern as "11011011" can also be regarded as "110110110" if "0" is added to the end of the pattern, and can be said to be periodic. On the other hand, "1101101" does not satisfy the above-mentioned condition whatever number of "0" is added to the end of the pattern, and is, therefore, aperiodic (random).

More generally, a captured two-dimensional image is expressed as a superposition of two-dimensional waves having various frequencies based on the principle of Fourier transform. Therefore, in a case where a coded captured image signal has been obtained with the use of a periodic coding pattern, an image is recorded in the form in which information about a specific frequency component out of frequency components included in a signal output from the pixels is lacked. In a case where such an image is subjected to shake correction, since the lacked frequency component is unable to be restored, the image quality of an image subjected to shake correction would decrease.

Figure 5B:
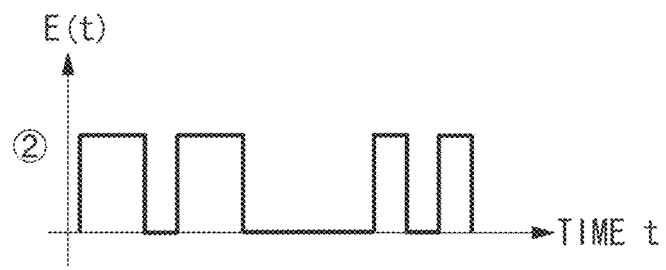

On the other hand, if the coding pattern is aperiodic as indicated by a graph illustrated in FIG. 5B, information about a specific frequency component out of frequency components included in a signal output from the pixels can be prevented from being lacked. Therefore, since an image having no lacked information is able to be recorded, an image having an appropriate image quality can be obtained even after shake correction.

In order to prevent the lack of information about a specific frequency component such as that mentioned above, it is desirable to select a coding pattern in consideration of the absolute value of a function obtained by performing Fourier transform on an exposure function E(t) corresponding to the coding pattern. Here, the exposure function E(t) is a function in which a coding pattern is expressed as a function of time with a charge accumulation period set to "1" and a period for discharging electric charges generated by photoelectric conversion set to "0".

Figure 5C:
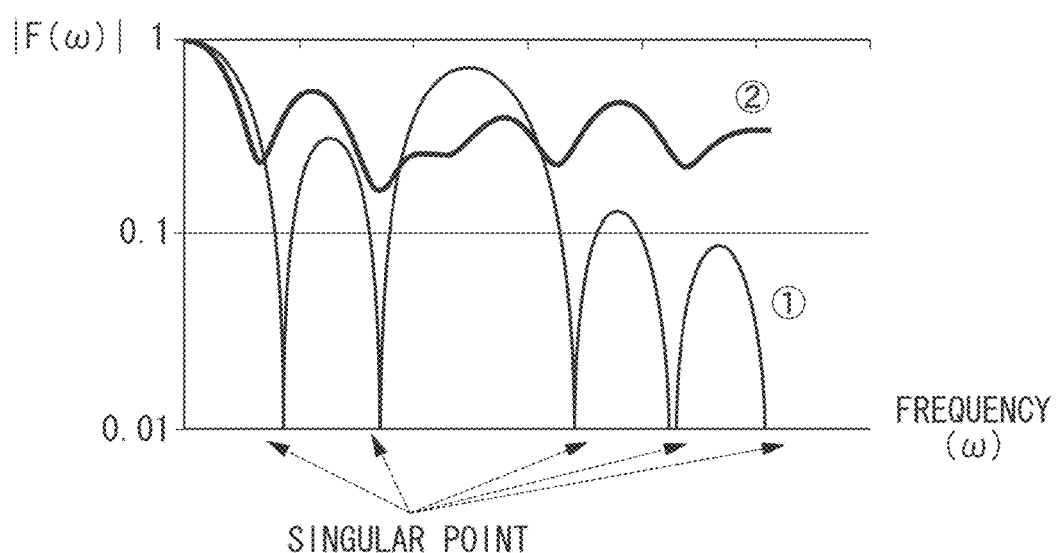

FIG. 5C illustrates a graph indicating results obtained by performing Fourier transform on the exposure function E(t) with respect to time t. The absolute value $|F(\omega)|$ of a function $F(\omega)$ obtained by performing Fourier transform on the exposure function E(t) with respect to time t represents an attenuation rate of each frequency component due to shaking, and, for example, in a case where "$|F(\omega')|=0$" results, it means that information about a frequency $\omega'$ disappears due to shaking.

Accordingly, if a coding pattern is selected in such a manner that a function obtained by performing Fourier transform on the exposure function E(t) does not have a singular point at which "$|F(\omega')|=0$" results, as indicated by a thick line in FIG. 5C, a coded captured image signal with the lack of frequency information prevented or reduced can be obtained.

Whether the absolute value of Fourier transform of an exposure function E(t) has the singular point can be determined as follows. In a case where the length of a signal sequence obtained when the exposure function E(t) is expressed by the shortest digital signal sequence (for example, "100101") is denoted by L (in the case of "100101", L=6), an integer N which satisfies the following formula is considered.

$$L \leq 2^N$$

At this time, "0" is consecutively added to the end of the above digital signal sequence, so that a signal sequence the length of which is the N-th power of 2 is generated ("100101" is changed to "10010100"). This operation is usually called "zero padding". The zero-padded signal sequence is subjected to fast Fourier transform, so that a discrete Fourier function $F(\omega)$ is obtained. At this time, it is assumed that a point at which the absolute value $|F(\omega)|$ of the Fourier function is sufficiently small (for example, equal to or less than $\frac{1}{1000}$ times) as compared with "$|F(0)|$" can be regarded as a singular point. Here, since the larger the integer N, the higher the frequency resolution of the function $F(\omega)$, the integer N should be set in such a manner that, for example, the N-th power of 2 becomes equal to or greater than four times of L.

In a case where coding image capturing is applied to the configuration discussed in Japanese Patent Application Laid-Open No. 2015-109503, since electric charges generated in different exposure periods (corresponding to charge accumulation periods) are added together at an accumulation portion, a first signal with lack of a specific frequency component prevented or reduced can be acquired. However, the configuration discussed in Japanese Patent Application Laid-Open No. 2015-109503 has such a remarkable issue that, since electric charges generated at the photoelectric conversion portion in a period between the different exposure periods are discharged, it is impossible to obtain an image having a high use efficiency of photo signals while acquiring a first signal with the lack of a specific frequency component being prevented or reduced.

On the other hand, according to the configuration of the present exemplary embodiment, obtaining a coded captured image signal based on the summed electric charges of electric charges generated in different charge accumulation periods enables acquiring a first signal with the lack of a specific frequency component prevented or reduced. Moreover, using a second signal which is based on electric charges generated in a period between the different charge accumulation periods, as mentioned above, enables obtaining an image having a high use efficiency of photo signals.

Furthermore, in the above-described configuration, a signal which is based on electric charges generated at the photoelectric conversion portion 301 in the charge accumulation period Ts3 is used as the second signal in the second charge holding period.

However, it is desirable that a second coded captured image signal which is based on the summed electric charges obtained by adding together electric charges generated in a plurality of charge accumulation periods be used as the second image signal in the second charge holding period. In this case, it is desirable that a coding pattern available for preventing or reducing the lack of a specific frequency component be used as the second signal as with the first signal. According to such a configuration, an image having a high use efficiency of photo signals with the lack of a specific frequency component further prevented or reduced can be obtained.

However, in a case where electric charges in all of the periods which are not included in an effective charge accumulation period for electric charges to be held by the charge holding portion 303A are the electric charges to be held by the charge holding portion 303B, a coding pattern for the charge holding portion 303B is not necessarily the one with the lack of frequency information prevented or reduced.

In such a case, electric charges generated in some periods out of all of the remaining periods are not transferred to the charge holding portion 303B, but are discharged to a charge discharging portion with the fifth transfer portion 309 turned on. With this, the lack of frequency information can be sometimes prevented or reduced even in a signal which is based on electric charges held by the charge holding portion 303B.

In other words, the transfer portion 309 and, for example, a charge discharging portion are added to the photoelectric conversion portion 301, and the start of a charge accumulation period can be regulated by turning on and off the transfer portion 309. For example, if the ON time of the transfer portion 309 is set longer, the start of the charge accumulation period becomes late, so that the length of the charge accumulation period can be shortened. With this, electric charges corresponding to an appropriate coding pattern can be held by the charge holding portion 303B.

A correlation in coding pattern between the charge holding portion 303A and the charge holding portion 303B and the image quality of an image subjected to shake correction are described with reference to FIGS. 6A and 6B.

During acquisition of the signal S3 and the signal S4, the central time between the start time and the end time of the first effective charge accumulation period is equal to the central time between the start time and the end time of the second effective charge accumulation period. Here, the term "equal" is used in consideration of an error in level that is able to be corrected at the time of forming an image.

In a case where such two central times greatly differ from each other, an image synthesized after shake correction performed on one or both images becomes a shaken image as if two images different in position are added together, so that an appropriate image quality may not be able to be obtained (an image 701 illustrated in FIG. 6A). Here, the central time tm is defined by the following formula using the exposure function E(t) where ti is the accumulation start time and tf is the accumulation end time.

$$tm = \frac{\int_{ti}^{tf} t \cdot E(t)dt}{\int_{ti}^{tf} E(t)dt}$$

On the other hand, for example, if, at the time of synthesis, a relative positional difference between two images is calculated and synthesis is performed after correction of the relative positional difference, the occurrence of a shaken image can be prevented, but a computation load may increase. It is desirable that patterns in charge accumulation periods for the charge holding portion 303A and the charge holding portion 303B be selected in such a manner that the difference between the central times of patterns in charge accumulation periods for the charge holding portion 303A and the charge holding portion 303B becomes smaller. More specifically, it is desirable that the central time tm1 of the pattern in the charge accumulation period for the charge holding portion 303A, at least, fall between the accumulation start time ti2 and the accumulation end time tf2 for the charge holding portion 303B and, in other words, satisfy the following formula.

$$ti2 \leq tm1 \leq tf2$$

If the patterns in the charge accumulation periods for the charge holding portion 303A and the charge holding portion 303B are selected in such a way as to satisfy the above condition, a synthesized image with shaking prevented or reduced can be obtained without performing correction of the relative positional difference (an image 702 illustrated in FIG. 6B). In a case where the above conditional formula is satisfied, in particular, when the central times tm1 and tm2 in the patterns in the charge accumulation periods for the charge holding portion 303A and the charge holding portion 303B coincide with each other, the effect to prevent or reduce a shaken image becomes largest.

Figure 7:
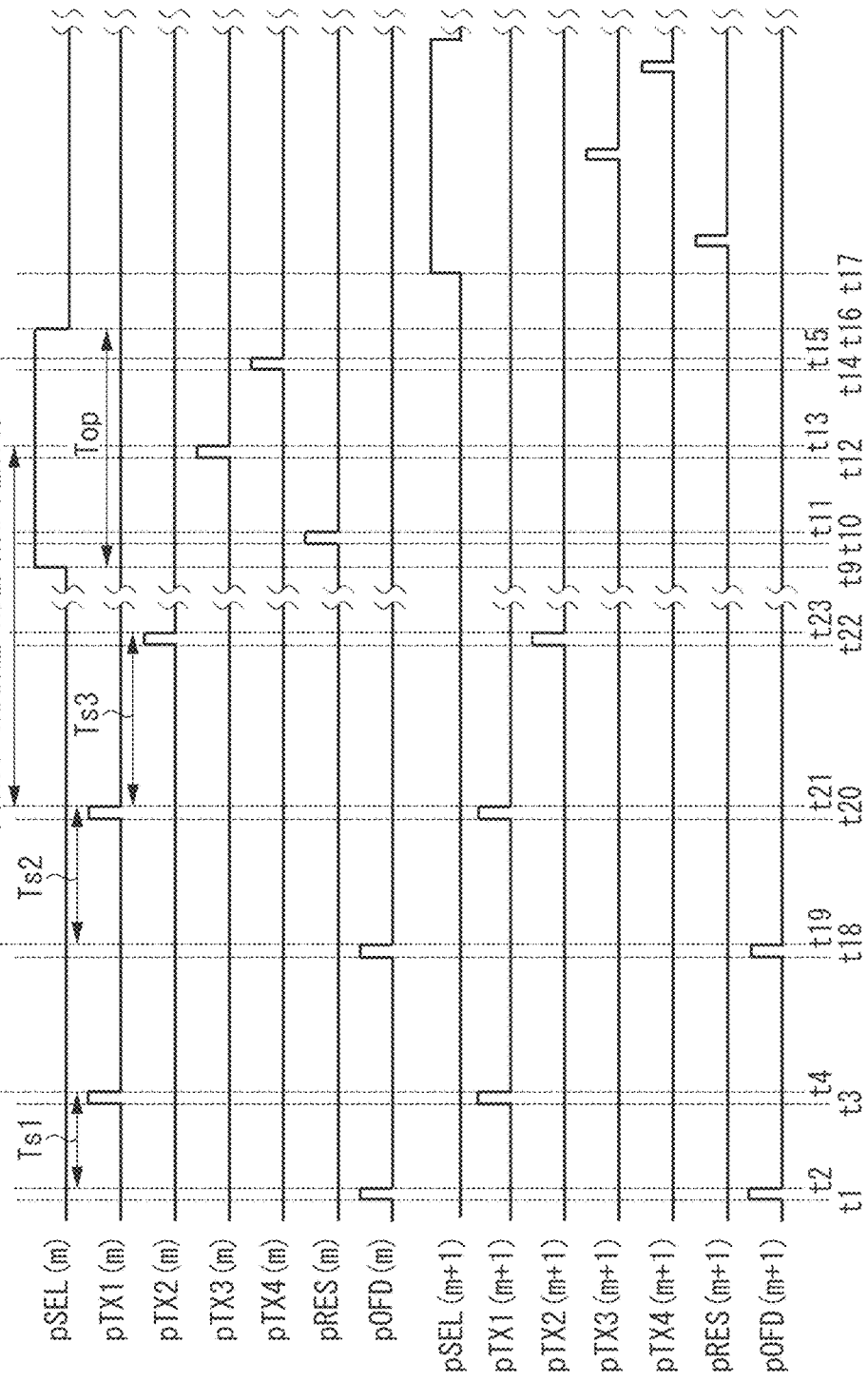
FIG. 7 illustrates drive pulses.

An imaging device according to a second exemplary embodiment is described with reference to FIG. 7. FIG. 7 differs from FIG. 4 in that the charge accumulation period Ts3, which is a charge accumulation period for electric charges to be held by the charge holding portion 303B, is not a period between the charge accumulation period Ts1 and the charge accumulation period Ts2, each of which is a charge accumulation period for electric charges to be held by the charge holding portion 303A. Here, a description is made about a period between time t4 and time t23, in which drive pulses are different from those illustrated in FIG. 4, in the n-th frame.

At time t4, the drive pulse pTX1 becomes at low level, so that the transfer portion 302A is turned off. At time t4, the charge accumulation period Ts1 ends.

At time t18, the drive pulse pOFD becomes at high level, so that the transfer portion 309 enters an on state. At time t19, the drive pulse pOFD becomes at low level, so that the transfer portion 309 enters an off state. With this, electric charges generated at the photoelectric conversion portion 301 in a period between time t4 and t19 are transferred to the charge discharging portion. Moreover, the charge accumulation period Ts2 (a second period) starts.

At time t20, the drive pulse pTX1 becomes at high level so that the transfer portion 302A enters an on state, and, at time t21, the drive pulse pTX1 becomes at low level so that the transfer portion 302A enters an off state. At time t21, the charge accumulation period Ts2 ends and the first charge holding period starts. Then, the charge accumulation period Ts3 (a third period) starts.

At time t22, the drive pulse pTX2 becomes at high level so that the transfer portion 302B enters an on state, and, at time t23, the drive pulse pTX2 becomes at low level so that the transfer portion 302B enters an off state. At time t23, the charge accumulation period Ts3 ends. At this time, the second charge holding period starts.

According to such a configuration, after electric charges generated at the photoelectric conversion portion 301 in the charge accumulation period Ts1 and the charge accumulation period Ts2 are held by the charge holding portion 303A, electric charges generated until the start of the output period Top can be held, so that the use efficiency of photo signals can be increased.

Furthermore, in a period between time t4 and time t19, the drive pulse pOFD can be kept at high level to continue discharging electric charges generated at the photoelectric conversion portion 301.

Even according to the present exemplary embodiment, an effect similar to that of the first exemplary embodiment can be obtained.

A third exemplary embodiment is described with reference to the drive pulse diagram of FIG. 8. Drive pulses illustrated in FIG. 8 differ from the drive pulses illustrated in FIG. 4 in that there is provided a plurality of charge accumulation periods having the same length in which electric charges to be held by the charge holding portion 303A are generated, and respective periods between the charge accumulation periods are different in length from each other.

For example, when there are charge accumulation periods Ts1, Ts2, and Ts4 in which electric charges to be held by the charge holding portion 303A are generated, the length from the end of the charge accumulation period Ts1 to the start of the charge accumulation period Ts2 is different from the length from the end of the charge accumulation period Ts2 to the start of the charge accumulation period Ts4. With this, the exposure function of a signal which is based on electric charges generated at the photoelectric conversion portion 301 in the charge accumulation period Ts1, the charge accumulation period Ts2, and the charge accumulation period Ts4, which are to be held by the charge holding portion 303A, becomes aperiodic, so that an image without the lack of information can be recorded.

With regard to the drive pulses illustrated in FIG. 8, only differences from the drive pulses illustrated in FIG. 4 are described. At time t4, the drive pulse pTX1 becomes at low level, so that the transfer portion 302A is turned off. At time t4, the charge accumulation period Ts1 ends and the charge accumulation period Ts3 (a third period) starts. Electric charges generated at the photoelectric conversion portion 301 in the charge accumulation period Ts1, which is a period between time t2 and time t4, are transferred to and held by the charge holding portion 303A.

At time t24, the drive pulse pTX2 becomes at high level, and, at time t25, the drive pulse pTX2 becomes at low level. At time t25, the charge accumulation period Ts3 ends and the charge accumulation period Ts2 starts.

Electric charges generated at the photoelectric conversion portion 301 in the charge accumulation period Ts3, which is a period between time t4 and time t25, are transferred to and held by the charge holding portion 303B. At this time, the second charge holding period starts.

At time t26, the drive pulse pTX1 becomes at high level, and, at time t27, the drive pulse pTX1 becomes at low level. At time t27, the charge accumulation period Ts2 ends and the first charge holding period starts. Then, the charge accumulation period Ts5 (a fifth period) starts.

Electric charges generated at the photoelectric conversion portion 301 in the charge accumulation period Ts2, which is a period between time t25 and time t27, are transferred to and held by the charge holding portion 303A. At this time, electric charges generated at the photoelectric conversion portion 301 in the charge accumulation period Ts1 and the charge accumulation period Ts2 are held by the charge holding portion 303A.

At time t28, the drive pulse pTX2 becomes at high level, and, at time t29, the drive pulse pTX2 becomes at low level. At time t29, the charge accumulation period Ts5 ends and the charge accumulation period Ts4 (a fourth period) starts. Electric charges generated at the photoelectric conversion portion 301 in the charge accumulation period Ts5, which is a period between time t27 and time t29, are transferred to and held by the charge holding portion 303B. At this time, electric charges generated at the photoelectric conversion portion 301 in the charge accumulation period Ts3 and the charge accumulation period Ts5 are held by the charge holding portion 303B.

At time t30, the drive pulse pTX1 becomes at high level, and, at time t31, the drive pulse pTX1 becomes at low level. At time t31, the charge accumulation period Ts4 ends. Electric charges generated at the photoelectric conversion portion 301 in the charge accumulation period Ts4, which is a period between time t29 and time t31, are transferred to and held by the charge holding portion 303A. At this time, electric charges generated at the photoelectric conversion portion 301 in the charge accumulation period Ts1, the charge accumulation period Ts2, and the charge accumulation period Ts4 are held by the charge holding portion 303A.

In the present exemplary embodiment, the length from the end of the charge accumulation period Ts1 to the start of the charge accumulation period Ts2 (a period between time t4 and t25) is different from the length from the end of the charge accumulation period Ts2 to the start of the charge accumulation period Ts4 (a period between time t27 and t29).

Then, a signal which is based on electric charges held by the charge holding portion 303A becomes aperiodic in the exposure function and becomes a coded captured image signal. Moreover, a signal which is based on electric charges held by the charge holding portion 303B also becomes aperiodic in the exposure function and becomes a coded captured image signal.

Even in such a configuration, an effect similar to that of the first exemplary embodiment can be obtained.

Furthermore, while, in the configuration of the present exemplary embodiment, the charge accumulation period Ts1, the charge accumulation period Ts2, and the charge accumulation period Ts4 are the same in the length of a charge accumulation period, but can be different from each other as in the first exemplary embodiment.

Moreover, in the present exemplary embodiment, electric charges generated at the photoelectric conversion portion 301 in the charge accumulation period Ts3 and the charge accumulation period Ts5 are held by the charge holding portion 303B. Therefore, the electric charges generated at the photoelectric conversion portion 301 in the charge accumulation period Ts3 and the charge accumulation period Ts5 can be efficiently held, so that the use efficiency of light can be increased.

Furthermore, the charge accumulation period Ts3 is a period between time t4 and time t25, and the charge accumulation period Ts5 is a period between time t27 and time t29. However, as long as electric charges generated in a part of the period between time t4 and time t25 or the period between time t27 and time t29 are held by the charge holding portion 303B, electric charges generated in a period other than the period between time t4 and time t25 or the period between time t27 and time t29 can be discharged to the charge discharging portion.

A fourth exemplary embodiment is described with reference to FIG. 9 and FIG. 10. The present exemplary embodiment differs from the first to third exemplary embodiments in that there is provided a plurality of input nodes with respect to a photoelectric conversion portion and electric charges are transferred to FDs configuring parts of the respective input nodes. In other words, the first FD serves also as a configuration of the first charge holding portion, and the second FD serves also as a configuration of the second charge holding portion.

Figure 9:
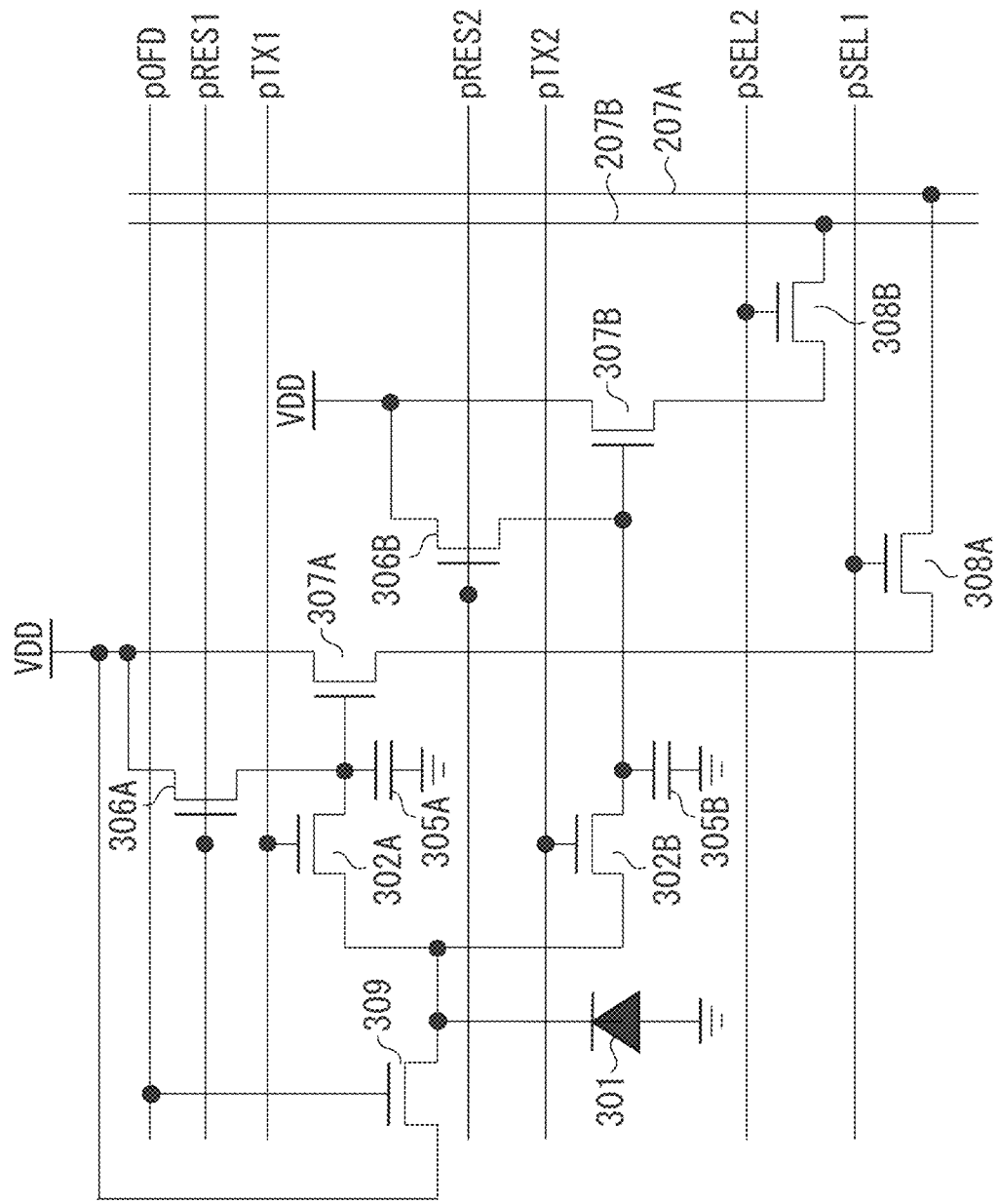
FIG. 9 is an equivalent circuit diagram of a pixel.
Figure 10:
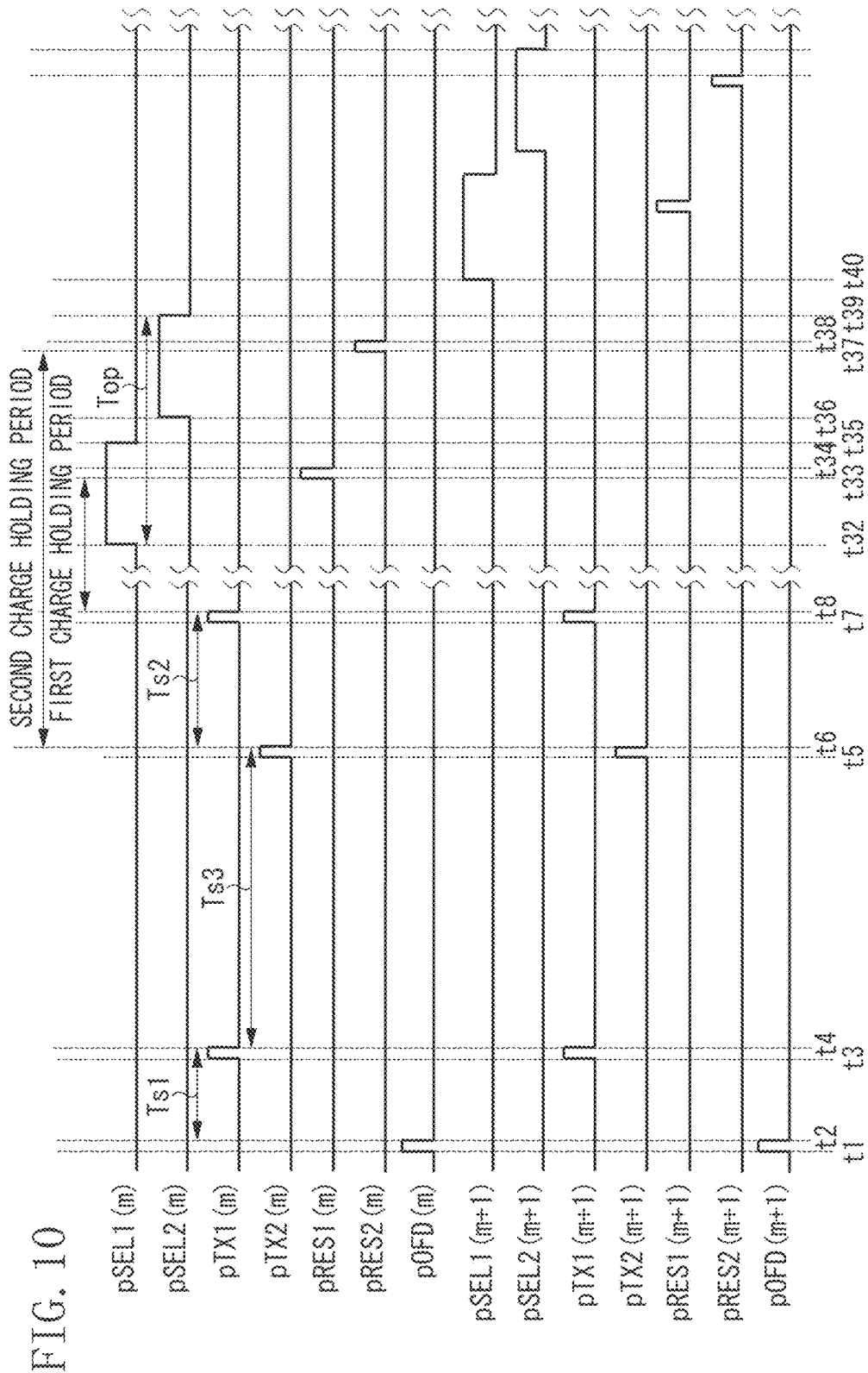
FIG. 10 illustrates drive pulses.

FIG. 9 is an equivalent circuit diagram of one pixel in the present exemplary embodiment. Here, only differences from the equivalent circuit diagram of FIG. 3 are described.

The transfer portion 302A transfers an electric charge generated at the photoelectric conversion portion 301 to an FD 305A. The transfer portion 302B transfers an electric charge generated at the photoelectric conversion portion 301 to an FD 305B.

The FD 305A holds an electric charge transferred from the photoelectric conversion portion 301 via the transfer portion 302A. The FD 305B holds an electric charge transferred from the photoelectric conversion portion 301 via the transfer portion 302B.

The gate of an amplifying portion 307A is connected to the FD 305A. Then, the FD 305A configures a part of the input node of the amplifying portion 307A. The amplifying portion 307A amplifies a signal which is based on electric charges transferred by the transfer portion 302A to the FD 305A, and then outputs the amplified signal to the signal line 207A. The gate of an amplifying portion 307B is connected to the FD 305B. Then, the FD 305B configures a part of the input node of the amplifying portion 307B. The amplifying portion 307B amplifies a signal which is based on electric charges transferred by the transfer portion 302B to the FD 305B, and then outputs the amplified signal to the signal line 207B.

A reset transistor 306A resets the electric potential of the input node of the amplifying portion 307A to an electric potential in the vicinity of the power supply voltage VDD. The gate of the reset transistor 306A is supplied with a drive pulse pRES1 so that the reset transistor 306A is switched between ON and OFF. A reset transistor 306B resets the electric potential of the input node of the amplifying portion 307B to an electric potential in the vicinity of the power supply voltage VDD. The gate of the reset transistor 306B is supplied with a drive pulse pRES2 so that the reset transistor 306B is switched between ON and OFF.

A selection transistor 308A switches between connection and non-connection of the pixel 201 to the signal line 207A. According to a switching operation of the selection transistor 308A for each pixel 201, signals from the pixels 201 are output to the signal line 207A in steps of one pixel or in steps of a plurality of pixels. The drain of the selection transistor 308A is connected to the output node of the amplifying portion 307A, and the source of the selection transistor 308A is connected to the signal line 207A.

A selection transistor 308B switches between connection and non-connection of the pixel 201 to the signal line 207B. According to a switching operation of the selection transistor 308B for each pixel 201, signals from the pixels 201 are output to the signal line 207B in steps of one pixel or in steps of a plurality of pixels. The drain of the selection transistor 308B is connected to the output node of the amplifying portion 307B, and the source of the selection transistor 308B is connected to the signal line 207B.

The drive pulses in the present exemplary embodiment are described with reference to FIG. 10. Here, only differences from the drive pulses illustrated in FIG. 4 are described. Electric charges accumulated at the photoelectric conversion portion 301 in the charge accumulation period Ts1 and electric charges accumulated at the photoelectric conversion portion 301 in the charge accumulation period Ts2 are added together and held by the FD 305A as electric charges. Electric charges accumulated at the photoelectric conversion portion 301 in the charge accumulation period Ts3 are held by the FD 305B.

Next, an output period is described. The drive pulses illustrated in FIG. 10 differ from those illustrated in FIG. 4 in that outputting of a signal is controlled based on row selection. Here, the output period Top for the m-th row is described.

At time t32, the drive pulse pSEL1 becomes at high level, so that the selection transistor 308A is turned on. At time t32, the output period Top starts. During a period between time t32 and time t33, a signal which is based on electric charges held by the FD 305A (a summed signal resulting from addition of the signal S3 and the signal N2) is output to the signal line 207A. At this time, the first charge holding period ends.

At time t33, the drive pulse pRES1 becomes at high level, so that the reset transistor 306A is turned on and the electric charges held by the FD 305A are discharged to the charge discharging portion.

Then, during a period between time t34 and time t35, the reset potential of the FD 305A is output as a signal N3 to the signal line 207A. At time t35, the drive pulse pSEL1 becomes at low level, so that the selection transistor 308A enters an off state.

At time t36, the drive pulse pSEL2 becomes at high level, so that the selection transistor 308B is turned on. During a period between time t36 and time t37, a signal which is based on electric charges held by the FD 305B (a summed signal resulting from addition of the signal S4 and the signal N4) is output to the signal line 207B. At this time, the second charge holding period ends.

At time t37, the drive pulse pRES2 becomes at high level, so that the reset transistor 306B is turned on and the electric charges held by the FD 305B are discharged to the charge discharging portion. Then, during a period between time t38 and time t39, the reset potential of the FD 305B is output as a signal N5 to the signal line 207B. At time t39, the drive pulse pSEL2 becomes at low level, so that the selection transistor 308B is turned off.

Furthermore, it is supposed that the signal N2 to be output here is a signal equivalent to the signal N3 and the signal N4 is a signal equivalent to the signal N5. However, in that case, an error occurs between the reset potential obtained before electric charges are held by the FD 305A and the reset potential obtained after electric charges are held by the FD 305A. Therefore, before electric charges generated at the photoelectric conversion portion 301 are transferred to the FD 305A and the FD 305B, signals which are based on respective electric charges of the FD 305A and the FD 305B can be output as the signal N2 and the signal N4.

Even in the configuration of the present exemplary embodiment, an effect similar to that of the first exemplary embodiment can be obtained. Moreover, since there is no charge holding portion 303 between the photoelectric conversion portion 301 and the FD 305, the area of the photoelectric conversion portion 301 can be made large, and a coded captured image signal with a decrease in sensitivity and saturation charge quantity prevented or reduced can be obtained.

Furthermore, the present exemplary embodiment is also applicable to the other exemplary embodiments.

A fifth exemplary embodiment is described with reference to FIG. 11 to FIG. 13. The present exemplary embodiment differs from the first to fourth exemplary embodiments in that there are provided three charge holding portions with respect to a photoelectric conversion portion.

Figure 11:
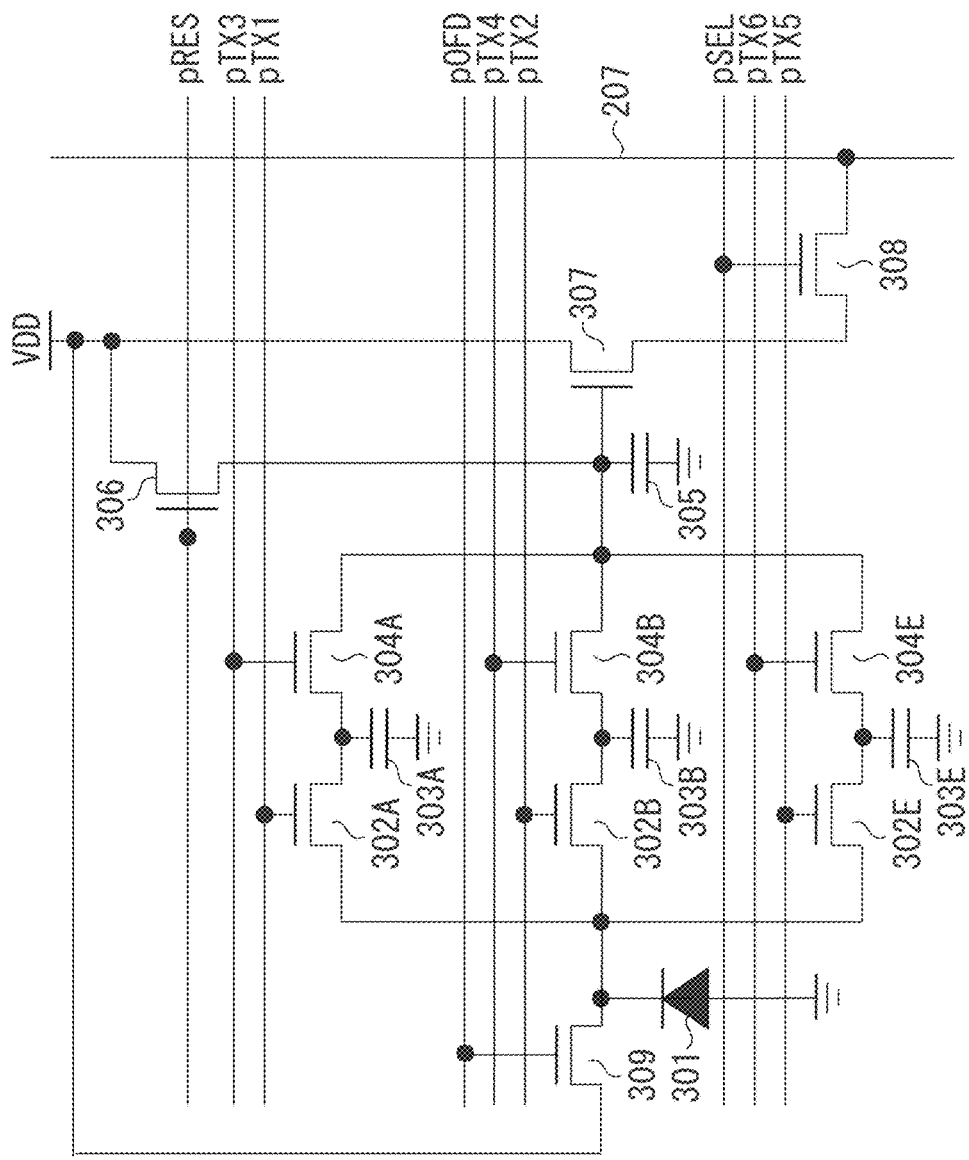
FIG. 11 is an equivalent circuit diagram of a pixel.

FIG. 11 is an equivalent circuit diagram of one pixel in the present exemplary embodiment. Here, only differences from FIG. 3 are described. A charge holding portion 303E holds an electron transferred from the photoelectric conversion portion 301 via a transfer portion 302E, which is described below. The FD 305 is shared by the charge holding portion 303A, the charge holding portion 303B, and the charge holding portion 303E.

Then, the FD 305 holds an electric charge transferred from at least one of the charge holding portion 303A, the charge holding portion 303B, and the charge holding portion 303E via the transfer portion 304A, the transfer portion 304B, and a transfer portion 304E, which is described below.

The transfer portion 302E (a sixth transfer portion) transfers an electric charge generated at the photoelectric conversion portion 301 to the charge holding portion 303E. The transfer portion 304E (a seventh transfer portion) transfers an electric charge held by the charge holding portion 303E to the FD 305. The transfer portion 302E and the transfer portion 304E are supplied with drive pulses pTX5 and pTX6, respectively, to be switched between ON and OFF. An electric charge is transferred by each transfer portion being turned on.

Figure 12:
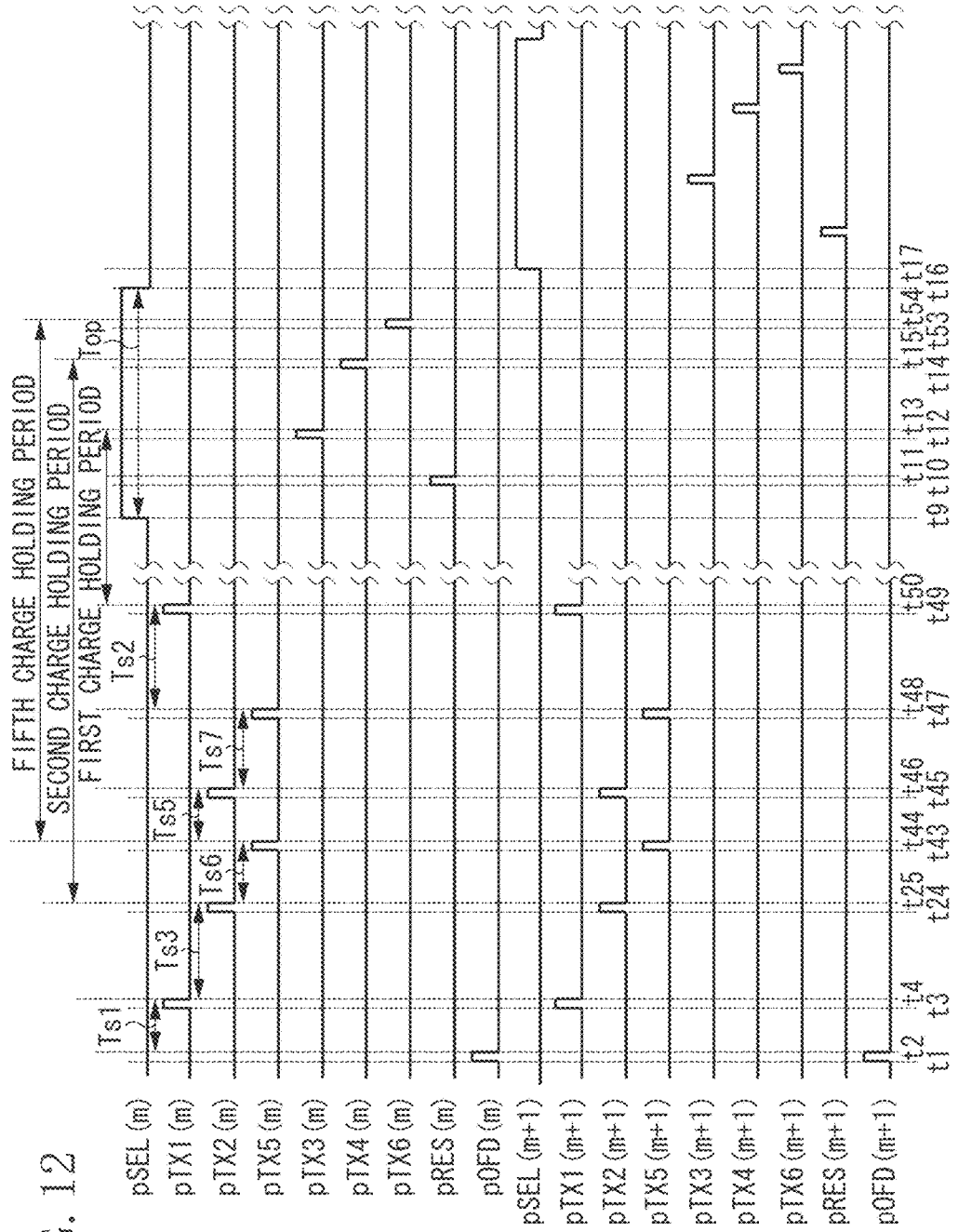
FIG. 12 illustrates drive pulses.
Figure 13:
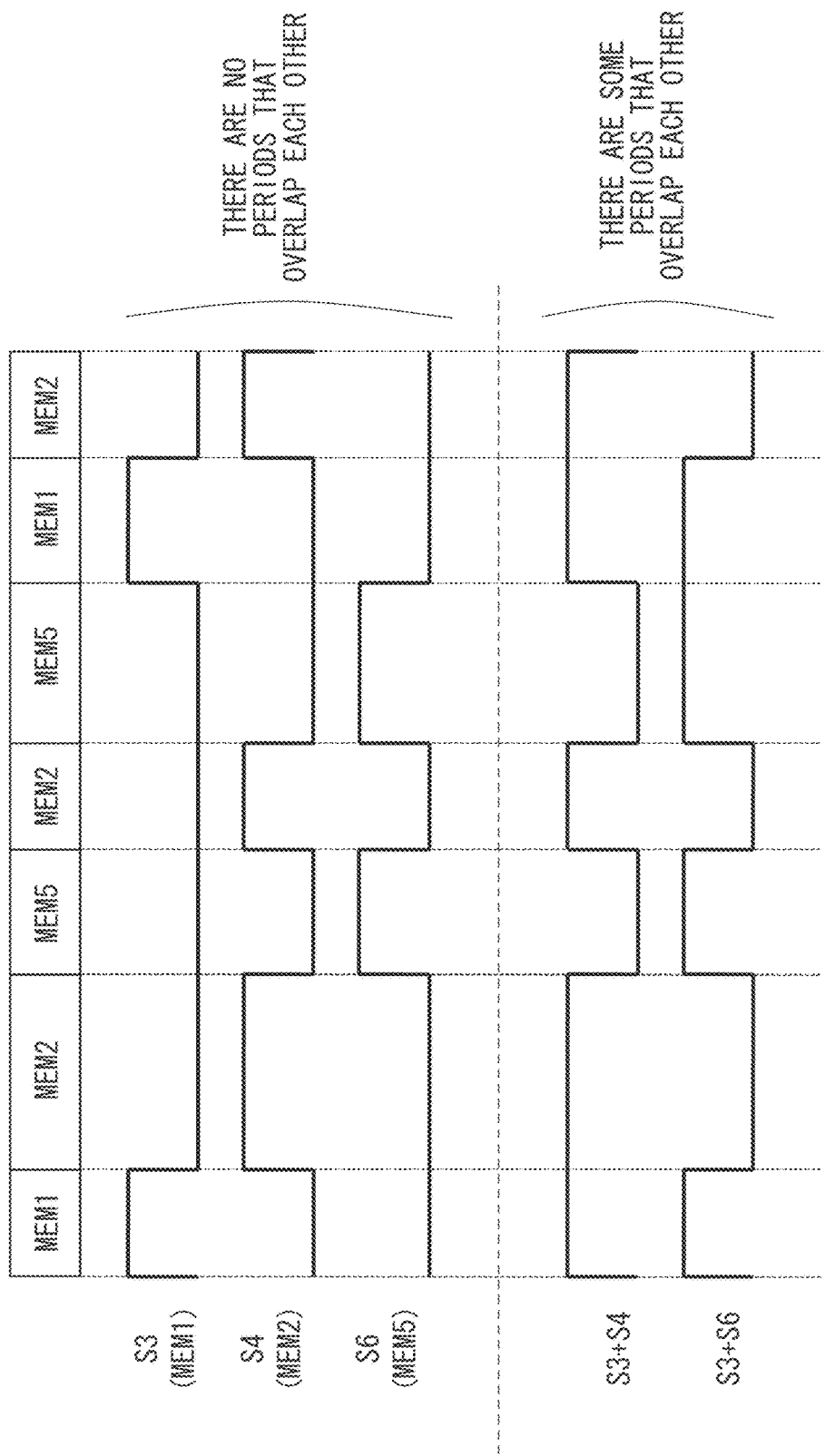
FIG. 13 is an explanatory diagram of selection of coding patterns.

FIG. 12 is a diagram illustrating drive pulses. Differences between the drive pulses illustrated in FIG. 12 and the drive pulses illustrated in FIG. 4 are described. At time t25, the drive pulse pTX2 becomes at low level, the charge accumulation period Ts3 ends, and the charge accumulation period Ts6 (a sixth period) starts. At this time, the second charge holding period starts.

At time t43, the drive pulse pTX5 becomes at high level, and, at time t44, the drive pulse pTX5 becomes at low level. The charge accumulation period Ts6 ends, and the charge accumulation period Ts5 starts. At this time, the fifth charge holding period starts. Electric charges generated at the photoelectric conversion portion 301 in the charge accumulation period Ts6, which is a period between time t25 and time t44, are transferred to the charge holding portion 303E via the transfer portion 302E and are then held by the charge holding portion 303E.

At time t45, the drive pulse pTX2 becomes at high level, and, at time t46, the drive pulse pTX2 becomes at low level. The charge accumulation period Ts5 ends, and the charge accumulation period Ts7 (a seventh period) starts. Electric charges generated at the photoelectric conversion portion 301 in the charge accumulation period Ts5, which is a period between time t44 and time t46, are transferred to the charge holding portion 303B via the transfer portion 302B and are then held by the charge holding portion 303B.

At time t47, the drive pulse pTX5 becomes at high level, and, at time t48, the drive pulse pTX5 becomes at low level. The charge accumulation period Ts7 ends, and the charge accumulation period Ts2 starts. Electric charges generated at the photoelectric conversion portion 301 in the charge accumulation period Ts7, which is a period between time t46 and time t48, are transferred to the charge holding portion 303E via the transfer portion 302E, so that the electric charges generated at the photoelectric conversion portion 301 in the charge accumulation period Ts6 and the electric charges generated at the photoelectric conversion portion 301 in the charge accumulation period Ts7 are held by the charge holding portion 303E.

At time t49, the drive pulse pTX1 becomes at high level, and, at time t50, the drive pulse pTX1 becomes at low level. The charge accumulation period Ts2 ends, and the first charge holding period starts.

Electric charges generated at the photoelectric conversion portion 301 in the charge accumulation period Ts2, which is a period between time t48 and time t50, are transferred to the charge holding portion 303A via the transfer portion 302A and are then held by the charge holding portion 303A.

Next, the output period Top is described. In this way, in the charge accumulation periods, pulses for causing the transfer portion 302 to enter an on state at different points of time are supplied as the drive pulses pTX1, pTX2, and pTX5. With this, signal electric charges generated at the photoelectric conversion portion 301 are time-shared and are then transferred to and held by the charge holding portion 303A, the charge holding portion 303B, and the charge holding portion 303E.

Description of the drive pulses during a period between time t9 and time t15 is similar to that in the first exemplary embodiment. At time t53, the drive pulse pTX6 becomes at high level, and, at time t54, the drive pulse pTX6 becomes at low level. At time t54, holding of electric charges at the charge holding portion 303E ends. With this, the electric charges generated in the charge accumulation period Ts6 and the electric charges generated in the charge accumulation period Ts7, both of which are held by the charge holding portion 303E, are transferred to the FD 305. Then, the fifth charge holding period ends.

Then, the FD 305 holds the electric charges generated in the respective charge accumulation periods Ts1, Ts2, Ts3, Ts5, Ts6, and Ts7. Then, during a period between time t54 and time t16, a signal S5 corresponding to the electric charges is output to the signal line 207.

At time t16, the drive pulse pSEL(m) becomes at low level, so that the selection transistor 308 enters an off state. With this, the m-th pixel row becomes non-selected.

With respect to four signals, i.e., the signal N, the signal S1, the signal S2, and the signal S5, which are sequentially output in the output period Top, the imaging device 101 or the outside thereof performs calculations of "S1−N", "S2−S1", and "S5−S2".

With this, a signal S3 which is based on the electric charges held by the charge holding portion 303A, a signal S4 which is based on the electric charges held by the charge holding portion 303B, and a signal S6 which is based on the electric charges held by the charge holding portion 303E, from each of which a fixed pattern noise is removed, can be obtained.

While, in FIG. 12, electric charges generated in a plurality of charge accumulation periods that do not overlap each other are held by the respective charge holding portions 303, at least the charge holding portion 303A only needs to hold the electric charges.

Next, a specific effect in a case where electric charges generated in a plurality of charge accumulation periods that do not overlap each other are held by a plurality of charge holding portions 303 is described with reference to FIG. 13.

According to the present exemplary embodiment, the signals S3, S4, and S6 of three types of coding patterns can be obtained. These three signals are used to generate, for example, a signal (S3+S4) which is based on a signal obtained by adding together the signal S3 and the signal S4 and a signal (S3+S6) which is based on a signal obtained by adding together the signal S3 and the signal S6. The signal (S3+S4) and the signal (S3+S6) are signals the coding patterns of which are different from each other in such a way as to include a partial period in an overlapping manner.

Thus, a coded captured image signal can be obtained in a combination of coding patterns higher in degree of freedom by a configuration having three charge holding portions than by a configuration having two charge holding portions.

While, here, a configuration having three charge holding portions has been described, more than three charge holding portions 303 can be provided to attain a similar effect.

The present exemplary embodiment is also applicable to the other exemplary embodiments.

A sixth exemplary embodiment is described with reference to FIG. 14 and FIG. 15. The present exemplary embodiment differs from the first to fifth exemplary embodiments in that each pixel includes a plurality of photoelectric conversion portions. More specifically, each of two photoelectric conversion portions located below each microlens includes a plurality of charge holding portions. While, here, a configuration in which two photoelectric conversion portions are arranged in each pixel is illustrated, more than two photoelectric conversion portions can be arranged.

Figure 14:
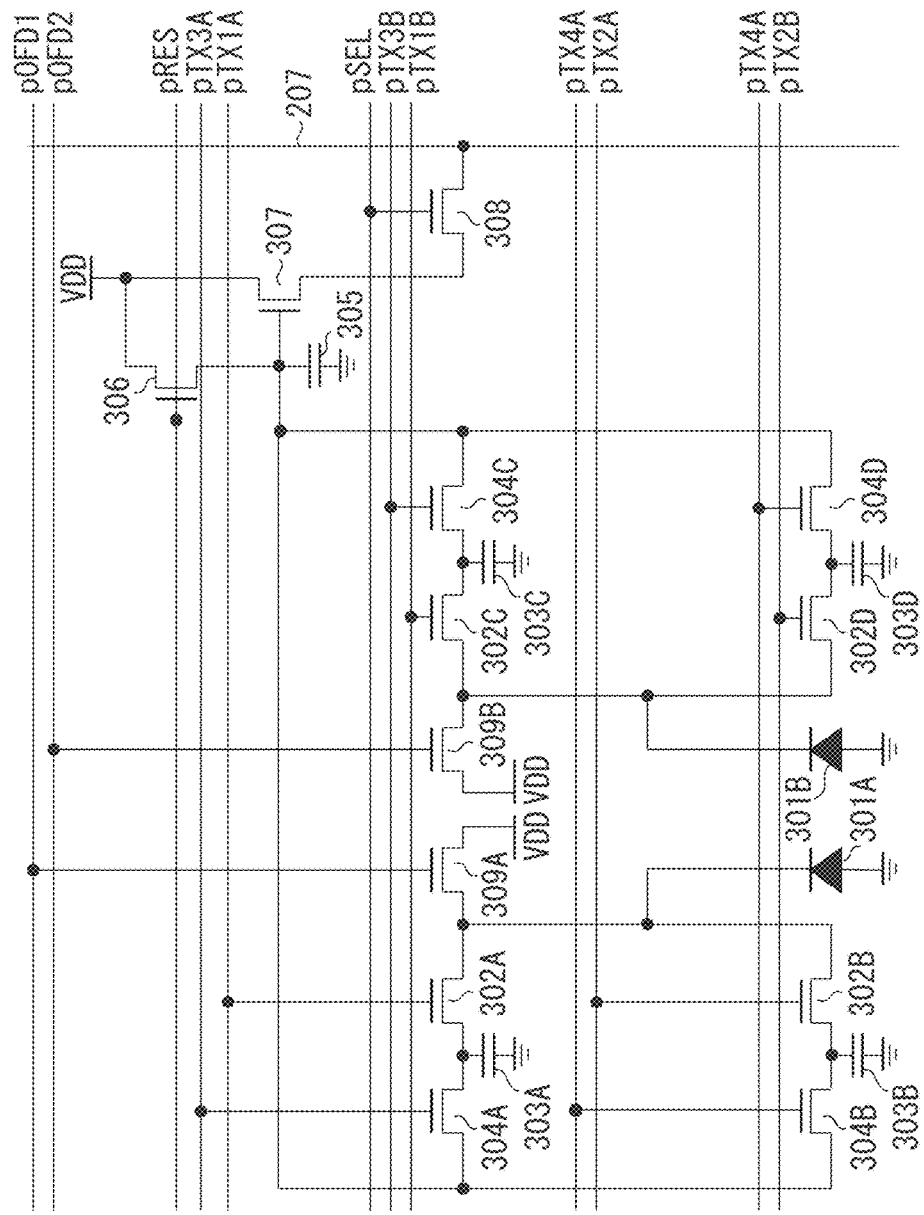
FIG. 14 is an equivalent circuit diagram of a pixel.

FIG. 14 is an equivalent circuit diagram of one pixel in the present exemplary embodiment. Here, differences from the equivalent circuit diagram of FIG. 3 are described.

A photoelectric conversion portion 301A and a photoelectric conversion portion 301B are arranged in one pixel. A transfer portion 302A transfers an electron generated at the photoelectric conversion portion 301A to a charge holding portion 303A. A transfer portion 302B transfers an electron generated at the photoelectric conversion portion 301A to a charge holding portion 303B. The gates of the transfer portions 302A and 302B are supplied with drive pulses pTX1A and pTX2A, respectively.

A transfer portion 304A transfers the electron held by the charge holding portion 303A to the FD 305. A transfer portion 304B transfers the electron held by the charge holding portion 303B to the FD 305. The gates of the transfer portions 304A and 304B are supplied with drive pulses pTX3A and pTX4A, respectively.

A transfer portion 302C transfers an electron generated at the photoelectric conversion portion 301B to a charge holding portion 303C, and a transfer portion 302D transfers an electron generated at the photoelectric conversion portion 301B to a charge holding portion 303D. The gates of the transfer portions 302C and 302D are supplied with drive pulses pTX1B and pTX2B, respectively.

A transfer portion 304C transfers an electron held by the charge holding portion 303C to the FD 305. A transfer portion 304D transfers an electron held by the charge holding portion 303D to the FD 305. The gates of the transfer portions 304C and 304D are supplied with drive pulses pTX3B and pTX4B, respectively.

A transfer portion 309A transfers an electron generated at the photoelectric conversion portion 301A to a charge discharging portion, and a transfer portion 309B transfers an electron generated at the photoelectric conversion portion 301B to the charge discharging portion. The gates of the transfer portions 309A and 309B are supplied with drive pulses pOFD1 and pOFD2, respectively.

Electric charges respectively transferred from the charge holding portion 303A, the charge holding portion 303B, the charge holding portion 303C, and the charge holding portion 303D are held by the FD 305.

Furthermore, while the FD 305 is configured to be shared by the photoelectric conversion portion 301A and the photoelectric conversion portion 301B, a semiconductor region in which separate FDs 305 are arranged can be provided.

Figure 15:
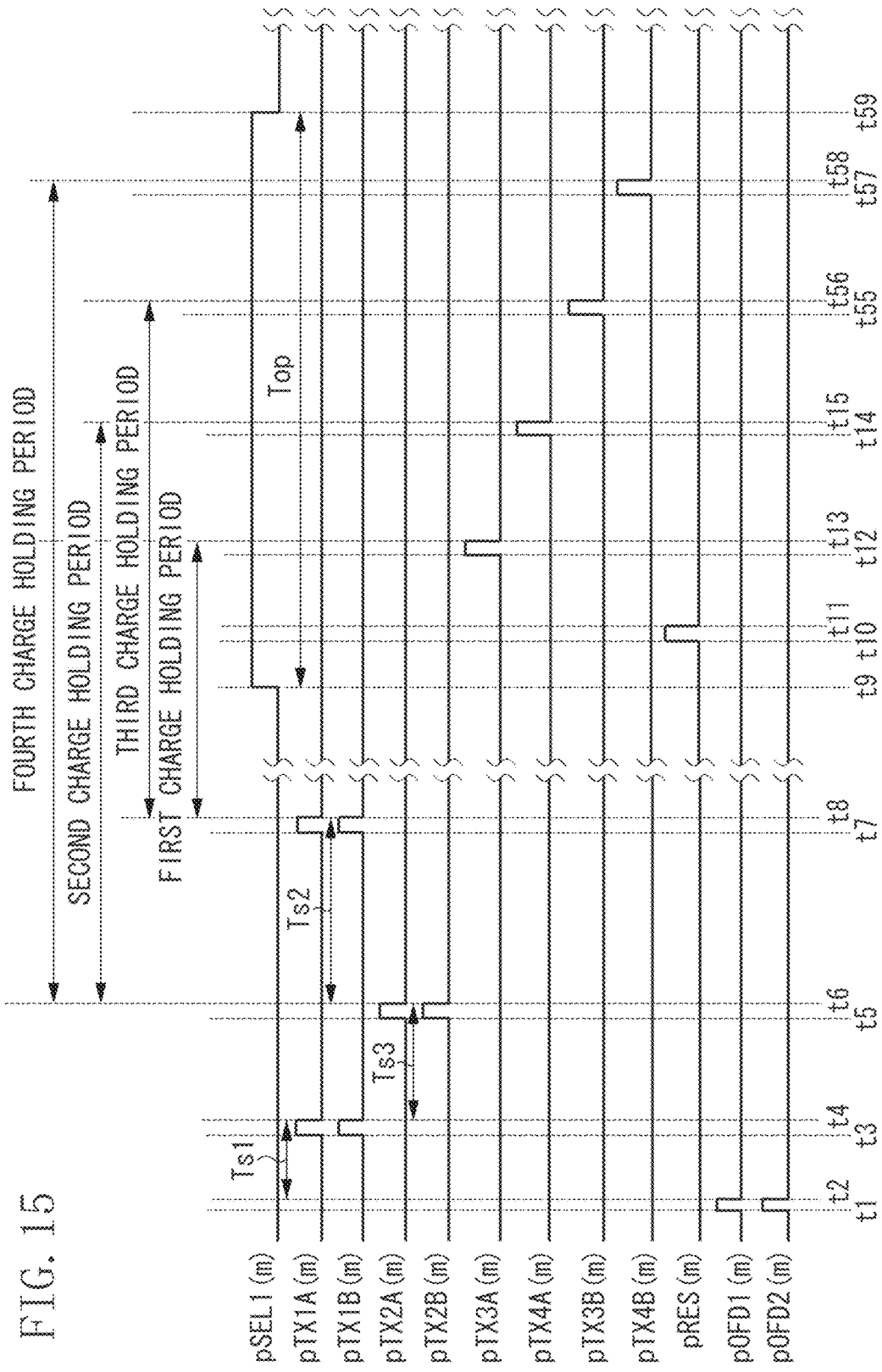
FIG. 15 illustrates drive pulses.

FIG. 15 is a timing chart illustrating a driving method for a pixel according to the present exemplary embodiment. Differences from the drive pulse diagram of FIG. 4 are described.

Referring to FIG. 15, at time t3, the drive pulses pTX1A and pTX1B become at high level, and, at time t4, the drive pulses pTX1A and pTX1B become at low level. With this, electric charges accumulated at the photoelectric conversion portion 301A in the charge accumulation period Ts1 are transferred to the charge holding portion 303A, and electric charges accumulated at the photoelectric conversion portion 301B are transferred to the charge holding portion 303C. Then, the third charge accumulation period Ts3 starts.

At time t5, the drive pulses pTX2A and pTX2B become at high level, and, at time t6, the drive pulses pTX2A and pTX2B become at low level. With this, electric charges accumulated at the photoelectric conversion portion 301A in the charge accumulation period Ts3 are transferred to the charge holding portion 303B, and electric charges accumulated at the photoelectric conversion portion 301B are transferred to the charge holding portion 303D. Then, the charge accumulation period Ts3 ends and the charge accumulation period Ts2 starts. Moreover, the second charge holding period and the fourth charge holding period start.

At time t7, the drive pulses pTX1A and pTX1B become at high level, and, at time t8, the drive pulses pTX1A and pTX1B become at low level. With this, the charge accumulation period Ts2 ends, electric charges accumulated at the photoelectric conversion portion 301A in the charge accumulation period Ts2 are transferred to the charge holding portion 303A, and the first charge holding period and the third charge holding period start.

The charge holding portion 303A holds electric charges generated at the photoelectric conversion portion 301A in the charge accumulation period Ts1 and electric charges generated at the photoelectric conversion portion 301A in the charge accumulation period Ts2. Moreover, the charge holding portion 303C holds electric charges generated at the photoelectric conversion portion 301B in the charge accumulation period Ts1 and electric charges generated at the photoelectric conversion portion 301B in the charge accumulation period Ts2.

Next, the output time Top is described. Description of the drive pulses during a period between time t9 and time t15 is similar to that of the drive pulses illustrated in FIG. 4. At time t9, the drive pulse pSEL becomes at high level, so that the output period Top starts.

At time t55, the drive pulse pTX3B becomes at high level, and, at time t56, the drive pulse pTX3B becomes at low level. With this, the electric charges generated at the photoelectric conversion portion 301B in the charge accumulation period Ts1 and the electric charges generated in the charge accumulation period Ts2, both of which are held by the charge holding portion 303C, are transferred to the FD 305. Then, the third charge holding period ends.

Then, the FD 305 holds the electric charges generated at the photoelectric conversion portion 301A in the respective charge accumulation periods Ts1, Ts2, and Ts3 and the electric charges generated at the photoelectric conversion portion 301B in the respective charge accumulation periods Ts1 and Ts2. Then, during a period between time t56 and time t57, a signal S corresponding to the electric charges is output to the signal line 207.

At time t57, the drive pulse pTX4B becomes at high level, and, at time t58, the drive pulse pTX4B becomes at low level. With this, the electric charges generated at the photoelectric conversion portion 301B in the charge accumulation period Ts3, which are held by the charge holding portion 303D, are transferred to the FD 305. Then, the fourth charge holding period ends. At time t59, the drive pulse pSEL becomes at low level, so that the output period Top ends.

Then, the FD 305 holds electric charges generated at the photoelectric conversion portion 301A and the photoelectric conversion portion 301B in the charge accumulation periods Ts1, Ts2, and Ts3. Then, during a period between time t58 and time t59, a signal S corresponding to the electric charges is output to the signal line 207.

Even in such a configuration, an effect similar to that of the first exemplary embodiment can be obtained. Furthermore, the charge accumulation periods for the photoelectric conversion portion 301A and the charge accumulation periods for the photoelectric conversion portion 301B are set to be the same, but can be set to be different. In that case, signals of coding patterns different between a signal corresponding to electric charges generated at the photoelectric conversion portion 301A and a signal corresponding to electric charges generated at the photoelectric conversion portion 301B can be acquired.

Furthermore, while the electric charges held by a charge holding portion which holds electric charges generated at the photoelectric conversion portion 301A are first transferred to the FD 305, the electric charges held by a charge holding portion which holds electric charges generated at the photoelectric conversion portion 301B can be first transferred to the FD 305. Alternatively, the transfer of electric charges can be alternated between a charge holding portion which holds electric charges generated at the photoelectric conversion portion 301A and a charge holding portion which holds electric charges generated at the photoelectric conversion portion 301B.

The pixel 201 having a plurality of photoelectric conversion portions in the above-described way can be used as an image capturing pixel or a pixel having a function other than image capturing (for example, focus detection using a phase-difference detection method).

Furthermore, the present exemplary embodiment is also applicable to the other exemplary embodiments.

Figure 16:
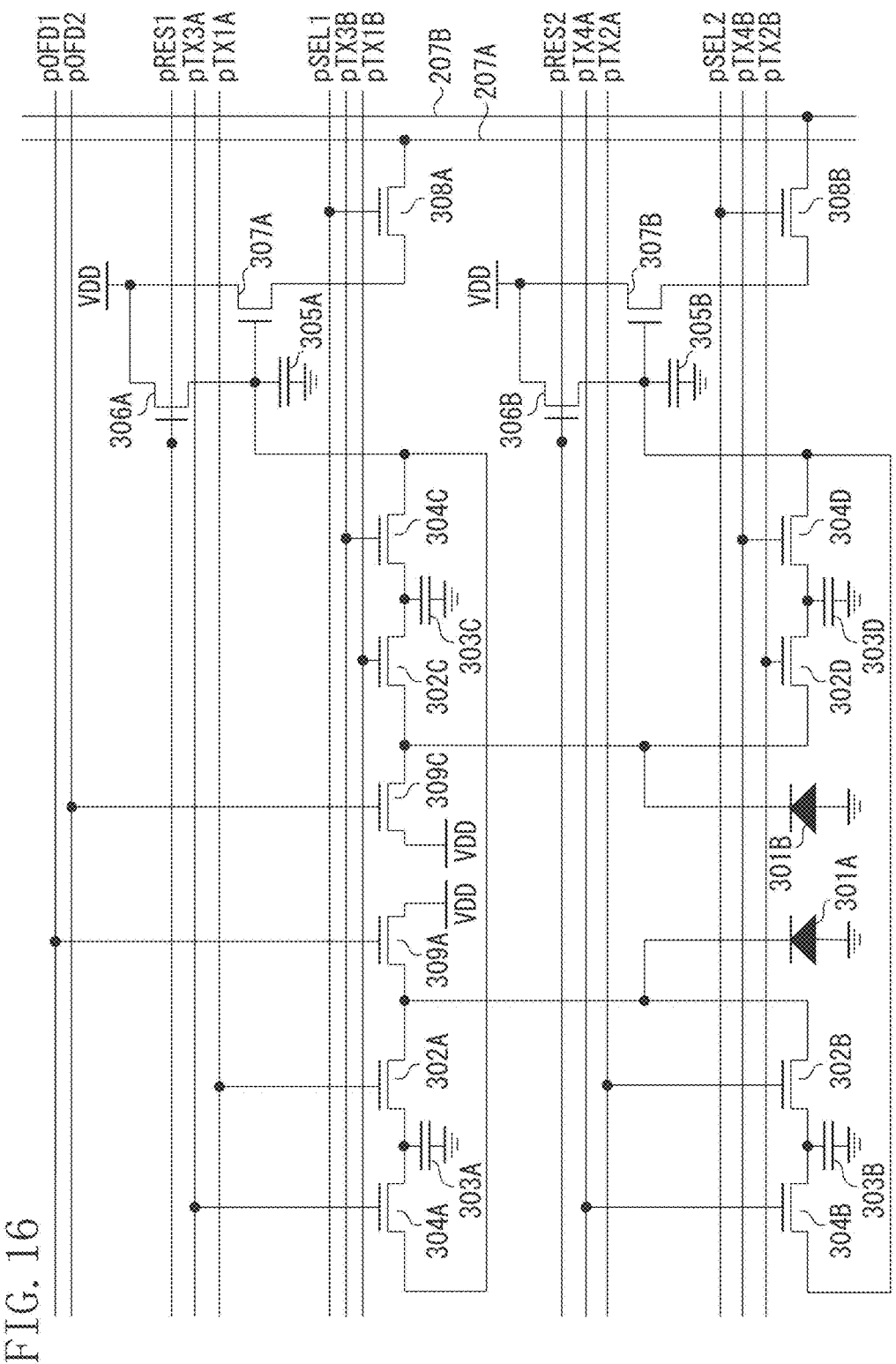
FIG. 16 is an equivalent circuit diagram of a pixel.

A seventh exemplary embodiment is described with reference to FIG. 16 and FIG. 17. FIG. 16 differs from FIG. 14 in that the present exemplary embodiment includes a plurality of FDs, a plurality of amplifying portions, and a plurality of selection transistors and each FD is shared by charge holding portions arranged with respect to the respective ones of a plurality of photoelectric conversion portions.

Differences between FIG. 16 and FIG. 14 are described. In FIG. 16, electric charges generated at the photoelectric conversion portion 301A, which are held by the charge holding portion 303A, are transferred to the FD 305A via the transfer portion 304A and are then held by the FD 305A. Electric charges generated at the photoelectric conversion portion 301B, which are held by the charge holding portion 303C, are transferred to the FD 305A via the transfer portion 304C and are then held by the FD 305A. Then, the electric charges held by the charge holding portion 303A and the electric charges held by the charge holding portion 303C are added together and held by the FD 305A.

The FD 305A configures a part of the input node (a first input node) of the amplifying portion 307A. Moreover, the reset transistor 306A resets the electric potential of the input node of the amplifying portion 307A to a reset potential.

A selection transistor 308A switches between connection and non-connection of the pixel 201 to the signal line 207A. According to a switching operation of the selection transistor 308A for each pixel 201, signals from the pixels 201 are output to the signal line 207A in steps of one pixel or in steps of a plurality of pixels. The drain of the selection transistor 308A is connected to the output node of the amplifying portion 307A.

Electric charges generated at the photoelectric conversion portion 301A, which are held by the charge holding portion 303B, are transferred to the FD 305B via the transfer portion 304B and are then held by the FD 305B. Electric charges generated at the photoelectric conversion portion 301B, which are held by the charge holding portion 303D, are transferred to the FD 305B via the transfer portion 304D and are then held by the FD 305B. Then, the electric charges held by the charge holding portion 303B and the electric charges held by the charge holding portion 303D are held by the FD 305B.

The FD 305B configures a part of the input node (a second input node) of the amplifying portion 307B. Moreover, the reset transistor 306B resets the electric potential of the input node of the amplifying portion 307B to a reset potential.

A selection transistor 308B switches between connection and non-connection of the pixel 201 to the signal line 207B. According to a switching operation of the selection transistor 308B for each pixel 201, signals from the pixels 201 are output to the signal line 207B in steps of one pixel or in steps of a plurality of pixels. The drain of the selection transistor 308B is connected to the output node of the amplifying portion 307B.

Figure 17:
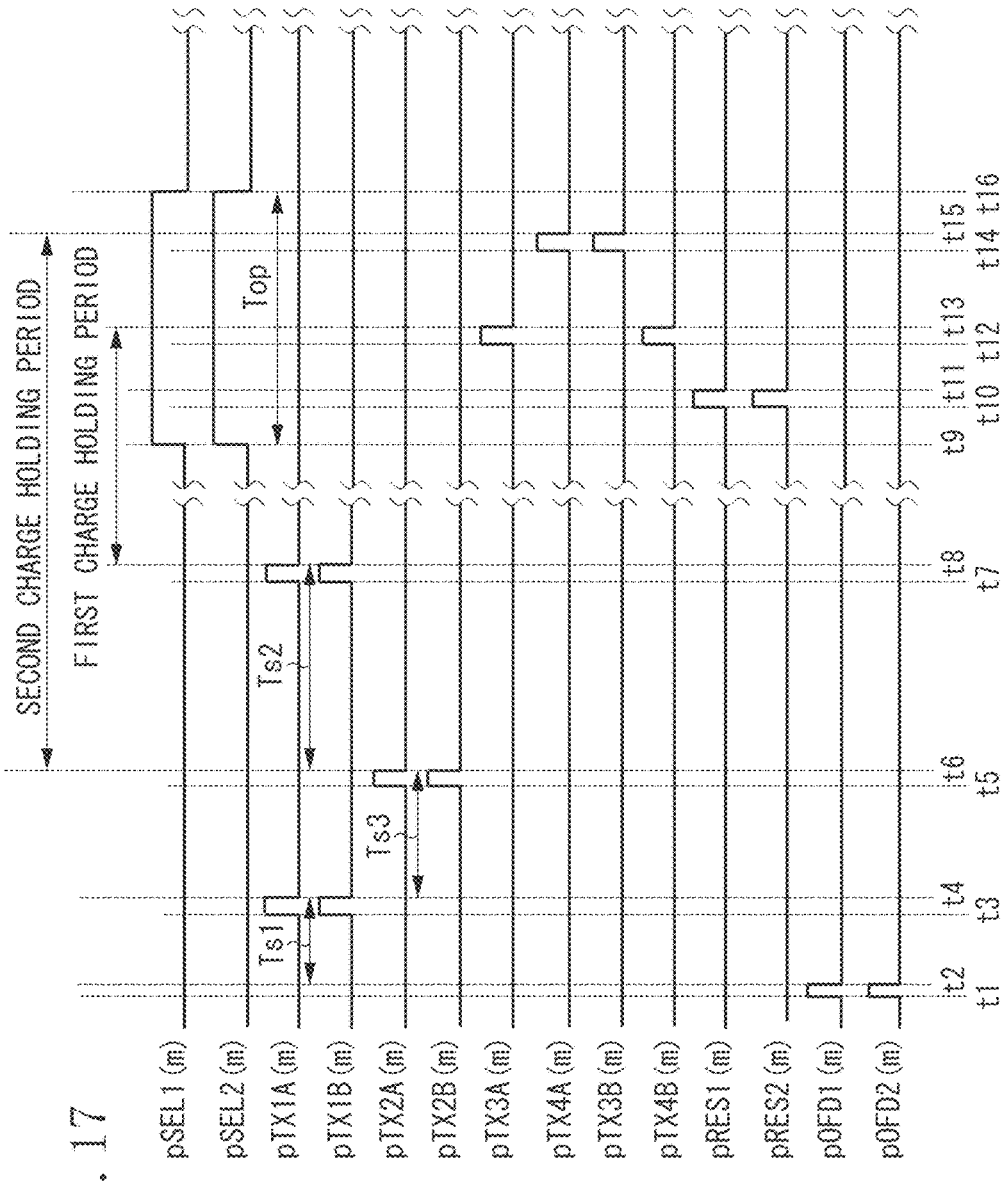
FIG. 17 illustrates drive pulses.

FIG. 17 is a drive pulse diagram illustrating a driving method for a pixel according to the present exemplary embodiment. Differences from the drive pulse diagram of FIG. 15 are described. FIG. 17 differs from FIG. 15 in the output period Top. In the output period Top illustrated in FIG. 17, a period for outputting, to the signal line 207A, a signal which is based on the electric charges transferred to the FD 305A and a period for outputting, to the signal line 207B, a signal which is based on the electric charges transferred to the FD 305B coincide with each other.

Even according to the present exemplary embodiment, an effect similar to that of the sixth exemplary embodiment can be obtained.

A drive concept in an eighth exemplary embodiment is described with reference to FIG. 18. The following description is made about a case where a moving image is captured by continuously outputting a coded captured image signal for a plurality of frames.

In the description of the present exemplary embodiment, a configuration of the equivalent circuit of a pixel is the same as in the first exemplary embodiment. A moving image is captured by obtaining a plurality of images for a plurality of frame periods. More specifically, for example, in the case of capturing an image with 60 frames per second, each frame period is 1/60 seconds. In the case of capturing a still image, each frame period is a time obtained by dividing a predetermined period by the number of captured images. For example, in the case of capturing images for 10 frames in one second, the frame period is 1/10 seconds. Moreover, the following examples are provided as the start time and the end time of a period corresponding to each frame period.

The first example is a case where the start time is the time at which transfer of electric charges generated at the photoelectric conversion portion in a preceding frame period is completed, and the end time is the time at which transfer of electric charges generated at the photoelectric conversion portion for generating an image of the current frame period ends.

The second example is a case where the start time is the time at which resetting of the photoelectric conversion portion is canceled and electric charge accumulation becomes possible at the photoelectric conversion portion, and the end time is the time at which resetting of the photoelectric conversion portion in a next frame period is canceled and electric charge accumulation becomes possible at the photoelectric conversion portion.

While, in FIG. 18, an operation in the first example is described, an operation in the second example can be performed. While these operations are specific examples, the accumulation time of the photoelectric conversion portion 301 can be flexibly changed by using the charge discharging portion. In such a case, the start time and the end time can be set to optional times in a period from the transfer completion time of electric charges generated at the photoelectric conversion portion in a preceding frame period to the time when resetting of the photoelectric conversion portion is canceled.

FIG. 18 conceptually illustrates electric charges generated at the photoelectric conversion portion, electric charges held by the charge holding portion, and output operations for them. The charge accumulation period is expressed as "PD(frame, charge accumulation period)". Moreover, the charge holding period is expressed as "MEM(frame, charge accumulation period in which electric charges being held are generated)". Then, the timing at which electric charges are transferred from the photoelectric conversion portion 301 to each charge holding portion 303 is indicated by an arrow.

In FIG. 18, operations for generating an image of the n-th frame are indicated by solid lines, and operations for generating images of the other frames are indicated by dashed lines. In the present exemplary embodiment, operations corresponding to the n-th frame are mainly described.

In FIG. 18, the period between time t1301 and time t1306 is a period corresponding to the n-th frame, and the period between time t1306 and time t1311 is a period corresponding to the (n+1)-th frame.

At time t1301, the period corresponding to the n-th frame starts. At time t1301, the accumulation of electric charges generated at the photoelectric conversion portion 301 is started. At this time, as electric charges for generating an image of the (n−1)-th frame, electric charges of MEM1(n−1, Ts1+Ts3) are held at the charge holding portion 303A, and electric charges of MEM2(n−1, Ts2+Ts4) are held at the charge holding portion 303B.

During a period between time t1301 and time t1302, signals corresponding to electric charges held by the charge holding portions 303A of pixels of the respective pixel rows and signals corresponding to electric charges held by the charge holding portions 303B thereof are sequentially output on a row-by-row basis.

At time t1303, electric charges of PD(n, Ts1) generated at the photoelectric conversion portions during a period between time t1301 and time t1303 are collectively transferred to the charge holding portions 303A of pixels of the respective pixel rows with respect to all the pixels. Then, in the photoelectric conversion portions 301 in which charge transfer is completed, the accumulation of electric charges is started.

At time t1304, electric charges of PD(n, Ts2) generated at the photoelectric conversion portions during a period between time t1303 and time t1304 are collectively transferred to the charge holding portions 303B of pixels of the respective pixel rows with respect to all the pixels. Then, in the photoelectric conversion portions 301 in which charge transfer is completed, the accumulation of electric charges is started.

At time t1305, electric charges of PD(n, Ts3) generated at the photoelectric conversion portions during a period between time t1304 and time t1305 are collectively transferred to the charge holding portions 303A of pixels of the respective pixel rows with respect to all the pixels. Then, in the photoelectric conversion portions 301 in which charge transfer is completed, the accumulation of electric charges is started. Furthermore, electric charges of PD(n, Ts1) and PD(n, Ts3) are held at the charge holding portion 303A.

At time t1306, electric charges of PD(n, Ts4) generated at the photoelectric conversion portions during a period between time t1305 and time t1306 are collectively transferred to the charge holding portions 303B of pixels of the respective pixel rows with respect to all the pixels. Then, in the photoelectric conversion portions 301 in which charge transfer is completed, the accumulation of electric charges is started. Furthermore, electric charges of PD(n, Ts2) and PD(n, Ts4) are held at the charge holding portion 303B.

Then, at time t1306, the transfer of electric charges for generating an image of the n-th frame is completed. Accordingly, at time t1306, a period corresponding to the (n+1)-th frame starts, and the accumulation of electric charges generated at the photoelectric conversion portion 301 starts.

During a period between time t1306 and time t1307, signals corresponding to electric charges held by the charge holding portions 303A and signals corresponding to electric charges held by the charge holding portions 303B are sequentially output on a row-by-row basis to the outside of each pixel. With this, two images which are based on signals output from the charge holding portion 303A and the charge holding portion 303B are obtained in image capturing for the n-th frame.

A desirable method for outputting such signals includes adding together electric charges different in charge accumulation period at the FD 305. This enables speeding up an output operation as compared with a case where signals which are based on electric charges generated in the respective charge accumulation periods are added together at a subsequent-stage circuit.

It is desirable that the coding patterns of the charge holding portion 303A and the charge holding portion 303B be set in such a manner that the time t1308 at which the frame targeted for holding of electric charges is changed from the n-th frame to the (n+1)-th frame is the same as or after the time t1307 at which reading of all the rows of the preceding frame (the n-th frame) is completed. With this, rolling shutter distortion which would occur during image capturing of a moving subject can be prevented or reduced. Therefore, electric charges generated at the photoelectric conversion portion during a period between time t1306 and time t1307 are temporarily held by the photoelectric conversion portion 301. Then, at time t1308, which is the same as or after the time t1307 at which the output period for the n-th frame ends, the electric charges held by the photoelectric conversion portion 301 are transferred to the charge holding portion 303A or the charge holding portion 303B.

According to such a configuration, since electric charges generated at the photoelectric conversion portion 301 during an output period are able to be used as electric charges for the next frame, a moving image composed of a plurality of coded captured image signals with a decrease of use efficiency of light prevented or reduced can be obtained.

Figure 19B:
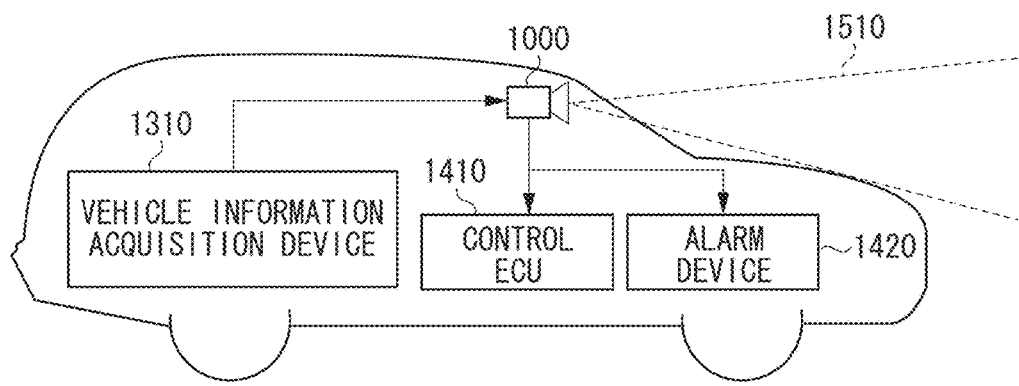

FIGS. 19A and 19B are diagrams illustrating configurations of an imaging system 1000 and a moving object, respectively, according to a ninth exemplary embodiment. FIG. 19A illustrates an example of the imaging system 1000, which is associated with a vehicle-mounted camera. The imaging system 1000 includes an imaging device 1010. The imaging device 1010 is any one of the imaging devices described in the above-described respective exemplary embodiments. The imaging system 1000 further includes an image processing unit 1030, which performs image processing on a plurality of pieces of image data acquired by the imaging device 1010, and a parallax acquisition unit 1040, which calculates parallax (a phase difference between parallax images) from a plurality of pieces of image data acquired by the imaging system 1000. Moreover, the imaging system 1000 further includes a distance acquisition unit 1050, which calculates a distance from the imaging system 1000 to a target object based on the calculated parallax, and a collision determination unit 1060, which determines whether there is a collision possibility based on the calculated distance. Here, the parallax acquisition unit 1040 or the distance acquisition unit 1050 is an example of a distance information acquisition unit configured to acquire distance information indicating a distance from the imaging system 1000 to a target object. Thus, the distance information is information concerning, for example, parallax, the amount of defocus, or a distance to a target object. The collision determination unit 1060 can determine a collision possibility using any one of these pieces of distance information. The distance information acquisition unit can be implemented by hardware designed for exclusive use or can be implemented by a software module. Moreover, the distance information acquisition unit can be implemented by, for example, a field programmable gate array (FPGA) or an application specific integrated circuit (ASIC), or can be implemented by a combination of these.

The imaging system 1000 is connected to a vehicle information acquisition device 1310 and is thus able to acquire vehicle information, such as vehicle speed, yaw rate, and steering angle. Moreover, the imaging system 1000 is connected to a control electronic control unit (ECU) 1410, which is a control device for outputting a control signal to generate braking force on a vehicle based on a result of determination by the collision determination unit 1060. Thus, the control ECU 1410 is an example of a moving object control unit configured to control a moving object based on the distance information. Additionally, the imaging system 1000 is also connected to an alarm device 1420, which alarms a driver based on a result of determination by the collision determination unit 1060. For example, in a case where the collision possibility is high as a result of determination by the collision determination unit 1060, the control ECU 1410 performs vehicle control to avoid a collision and reduce damage by, for example, applying the brakes, returning an accelerator pedal, or reducing engine output. The alarm device 1420 issues a warning to a user by, for example, sounding an alarm such as sound, displaying alarm information on a screen of, for example, a car navigation system, or applying a vibration to a shoulder harness or a steering wheel.

In the present exemplary embodiment, the imaging system 1000 captures an image of the surroundings of a vehicle, such as a view in front of or behind the vehicle. FIG. 19B illustrates the imaging system 1000, which is used to capture an image of the view in front of the vehicle (an image capturing range 1510). The vehicle information acquisition device 1310 issues an instruction to cause the imaging system 1000 to operate to perform image capturing. Employing the imaging device in each of the above-described exemplary embodiments as the imaging device 1010 enables the imaging system 1000 in the present exemplary embodiment to further improve the accuracy of distance measurement.

While, in the above description, the present exemplary embodiment is applied to an example of a control operation for preventing collision with another vehicle, the present exemplary embodiment is also applicable to, for example, a control operation for performing automated driving to follow another vehicle or a control operation for performing automated driving to keep the lane. Moreover, the imaging system can be applied to not only a vehicle such as a car but also a moving object (a moving apparatus), such as a ship, an airplane, or an industrial robot. Additionally, the imaging system can be applied to not only the moving object but also an equipment which widely uses object recognition, such as an intelligent transport system (ITS).

The above-described exemplary embodiments merely illustrate specific examples for implementing the present invention, and these examples should not be construed to limit the technical scope of the present invention. In other words, the present invention can be implemented in various modes without departing from the technical idea of the present invention or the primary features thereof. Moreover, the present invention can be implemented by combining at least some of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-150328 filed Jul. 29, 2016, which is hereby incorporated by reference herein in its entirety.

What is claimed is:
1. An imaging device comprising:
a plurality of pixels arranged in a plurality of rows and a plurality of columns, each pixel including a photoelectric conversion portion, a first charge holding portion, and a second charge holding portion,
wherein, during a first period, electric charges generated at the photoelectric conversion portion are held, the first charge holding portion holds electric charges generated at the photoelectric conversion portion in a second period that does not succeed the first period and having a duration different from the first period,
wherein the second charge holding portion holds electric charges generated at the photoelectric conversion portion in a third period that does not overlap with the first period and the second period, and
wherein a first charge holding period during which the electric charges generated at the photoelectric conversion portion in the first period and the electric charges generated at the photoelectric conversion portion in the second period are held by the first charge holding portion and a second charge holding period during which the electric charges generated at the photoelectric conversion portion in the third period are held by the second charge holding portion overlap each other.

2. The imaging device according to claim 1,
wherein the second period occurs after the first period, and the third period is a period between the first period and the second period,
wherein the first charge holding period includes a fourth period after the second period, and the fourth period is a period that does not succeed the second period, and
wherein a duration from an end of the first period to a start of the second period is different from a duration from an end of the second period to a start of the fourth period.

3. The imaging device according to claim 2, wherein the fourth period is different in length from each of the first period and the second period.

4. The imaging device according to claim 2,
wherein the second period occurs after the first period,
the third period is a period between the first period and the second period, and
the fourth period occurs after the second period,
wherein the second charge holding portion holds electric charges generated at the photoelectric conversion portion in a fifth period, and
wherein the fifth period is at least a part of a period from an end of the second period to an end of the fourth period.

5. The imaging device according to claim 1, wherein the pixel further includes
an amplifying portion having an input node to which the electric charges held by at least one of the first charge holding portion and the second charge holding portion are transferred, and configured to output a signal which is based on the electric charges transferred to the input node,
a third transfer portion configured to perform an operation to transfer electric charges held by the first charge holding portion to the input node, and
a fourth transfer portion configured to perform an operation to transfer electric charges held by the second charge holding portion to the input node while electric charges held by the first charge holding portion are transferred to the input node by the third transfer portion.

6. The imaging device according to claim 5, wherein a period during which the photoelectric conversion portion generates electric charges to be transferred to the first charge holding portion is shorter in length than a period during which the photoelectric conversion portion generates electric charges to be transferred to the second charge holding portion.

7. The imaging device according to claim 1, wherein the third period is at least a part of a period from an end of the first period to a start of the second period.

8. The imaging device according to claim 7, wherein an exposure function of the electric charges held by the second charge holding portion in the second charge holding period is aperiodic.

9. The imaging device according to claim 1, wherein an exposure function of the electric charges held by the first charge holding portion in the first charge holding period is aperiodic.

10. The imaging device according to claim 1,
wherein the pixel further includes an amplifying portion having an input node to which electric charges held by at least one of the first charge holding portion and the second charge holding portion are transferred, and configured to output a signal which is based on the electric charges transferred to the input node,
wherein the imaging device further comprises an analog-digital conversion portion configured to convert an analog signal output from the amplifying portion into a digital signal, and
wherein the analog-digital conversion portion outputs a first signal which corresponds to electric charges held by the first charge holding portion and a second signal which corresponds to electric charges held by the second charge holding portion.

11. An imaging system comprising:
the imaging device according to claim 10;
a correction unit configured to perform shake correction on a signal output from the analog-digital conversion portion; and
a synthesis unit configured to combine signals output from the correction unit,
wherein the correction unit outputs a first image signal obtained by performing shake correction on the first signal and a second image signal obtained by performing shake correction on the second signal, and
wherein the synthesis unit combines the first image signal and the second image signal to form an image signal serving as one image.

12. An imaging system comprising:
the imaging device according to claim 10;
a correction unit configured to perform shake correction on a signal output from the analog-digital conversion portion; and
a synthesis unit configured to combine signals output from the correction unit,
wherein the correction unit outputs a first image signal obtained by performing shake correction on the first signal, and
wherein the synthesis unit combines the first image signal and the second signal to form an image signal serving as one image.

13. The imaging device according to claim 1, wherein the imaging device performs a global electronic shutter operation in which start of accumulation of electric charges in the photoelectric conversion portion and transfer of electric charges from the photoelectric conversion portion to each of the first and second charge holding portions are aligned between a plurality of pixel rows.

14. The imaging device according to claim 1,
wherein the pixel further includes a charge discharging portion configured to discharge a part of electric charges generated at the photoelectric conversion portion, and a fifth transfer portion configured to transfer electric charges generated at the photoelectric conversion portion to the charge discharging portion, and
wherein at least one of the first period, the second period, and the third period is started by changing the fifth transfer portion from an on state to an off state.

15. The imaging device according to claim 1,
wherein a sum of periods in which electric charges to be held by the first charge holding portion are generated at the photoelectric conversion portion is set as a first effective charge accumulation period,
wherein a sum of periods in which electric charges to be held by the second charge holding portion are generated at the photoelectric conversion portion is set as a second effective charge accumulation period,
wherein a start time of the first effective charge accumulation period and a start time of the second effective charge accumulation period are different from each other, wherein an end time of the first effective charge accumulation period and an end time of the second effective charge accumulation period are different from each other, and wherein a central time between the start time and end time of the first effective charge accumulation period and a central time between the start time and end time of the second effective charge accumulation period are equal to each other.

16. The imaging device according to claim 1,
wherein the pixel includes
two photoelectric conversion units each corresponding to the photoelectric conversion portion, and
at least two charge holding portions, including the first charge holding portion and the second charge holding portion, provided with respect to each of the two photoelectric conversion units and configured to hold electric charges generated at the two photoelectric conversion units, and
wherein all of the charge holding portions included in the pixel are connected to a common input node.

17. The imaging device according to claim 1,
wherein the pixel includes
two photoelectric conversion units each corresponding to the photoelectric conversion portion, and
at least two charge holding portions, including the first charge holding portion and the second charge holding portion, provided with respect to each of the two photoelectric conversion units and configured to hold electric charges generated at the two photoelectric conversion units,
wherein one charge holding portion which holds an electric charge generated at one photoelectric conversion unit and one charge holding portion which holds an electric charge generated at the other photoelectric conversion unit are electrically connected to a first input node, and
wherein the other charge holding portion which holds an electric charge generated at the one photoelectric conversion unit and the other charge holding portion which holds an electric charge generated at the other photoelectric conversion unit are electrically connected to a second input node different from the first input node.

18. An imaging system comprising:
an imaging device according to claim 1; and
a signal processing unit configured to process a signal output from the imaging device.

19. A moving object comprising:
an imaging device according to claim 1;
a distance information acquisition unit configured to acquire distance information indicating a distance from the imaging device to a subject from parallax images which are based on signals from the imaging device; and
a moving object control unit configured to control the moving object based on the distance information.

20. An imaging device comprising:
a plurality of pixels arranged in a plurality of rows and a plurality of columns, each pixel including a photoelectric conversion portion, a first charge holding portion configured, and a second charge holding portion,
wherein, while holding electric charges generated at the photoelectric conversion portion in a first period, the first charge holding portion holds electric charges generated at the photoelectric conversion portion in a second period which is a period that does not succeed the first period, and, while holding electric charges generated at the photoelectric conversion portion in the first period and the second period, the first charge holding portion holds electric charges generated at the photoelectric conversion portion in a fourth period which is a period that does not succeed the first period and the second period, wherein the second charge holding portion holds electric charges generated at the photoelectric conversion portion in a third period which is a period that does not overlap the first period, the second period, and the fourth period, wherein a length from an end of the first period to a start of the second period is different from a length from an end of the second period to a start of the fourth period, and wherein a first charge holding period during which electric charges generated at the photoelectric conversion portion in the first period, electric charges generated at the photoelectric conversion portion in the second period, and electric charges generated at the photoelectric conversion portion in the fourth period are held by the first charge holding portion and a second charge holding period during which electric charges generated at the photoelectric conversion portion in the third period are held by the second charge holding portion overlap each other.

21. The imaging device according to claim 20, wherein at least two periods of the first period, the second period, and the fourth period are equal in length.

22. An imaging device comprising:
a plurality of pixels arranged in rows and columns, each pixel including a photoelectric conversion portion, a first charge holding portion, a second charge holding portion, a first transfer portion connected to the photoelectric conversion portion and the first charge holding portion, and a second transfer portion connected to the photoelectric conversion portion and the second charge holding portion, wherein first electric charges generated at the photoelectric conversion portion in a first period are transferred by the first transfer portion from the photoelectric conversion portion to the first charge holding portion, and second electric charges generated at the photoelectric conversion portion in a second period which is a period that does not succeed the first period and which is different in length from the first period are transferred by the first transfer portion from the photoelectric conversion portion to the first charge holding portion holding the first electric charges, wherein third electric charges generated at the photoelectric conversion portion in a third period which is a period that does not overlap the first period and the second period are transferred by the second transfer portion from the photoelectric conversion portion to the second charge holding portion, and wherein a period during which the first charge holding portion holds the first electric charges and the second electric charges and a period during which the second charge holding portion holds the third electric charges overlap each other.

* * * * *